US 9,519,810 B2

(12) United States Patent
Gao et al.

(10) Patent No.: US 9,519,810 B2
(45) Date of Patent: Dec. 13, 2016

(54) CALIBRATION AND SELF-TEST IN AUTOMATED DATA READING SYSTEMS

(71) Applicant: Datalogic ADC, Inc., Eugene, OR (US)

(72) Inventors: WenLiang Gao, Eugene, OR (US); Jeffrey J. Hoskinson, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 352 days.

(21) Appl. No.: 13/948,036

(22) Filed: Jul. 22, 2013

(65) Prior Publication Data

US 2014/0034731 A1 Feb. 6, 2014

Related U.S. Application Data

(60) Provisional application No. 61/678,015, filed on Jul. 31, 2012.

(51) Int. Cl.
*G06K 7/10* (2006.01)
*G06K 7/14* (2006.01)
(Continued)

(52) U.S. Cl.
CPC .......... *G06K 7/015* (2013.01); *G06K 7/10811* (2013.01); *G06K 7/10861* (2013.01); *G06K 7/146* (2013.01); *G06K 7/1443* (2013.01); *G06T 7/0018* (2013.01)

(58) Field of Classification Search
CPC .......... A47F 9/046; A47F 9/047; A47F 9/048; G07G 1/0045; G06K 7/015; G06K 7/1443; G06K 7/10792; G06K 7/1413; G06K 7/1417; G06K 7/1439; G06K 7/1447; G06K 7/1452; G06K 7/1456; G01B 11/00; G01B 11/022; G01B 11/024; G01B 11/026; G01B 11/0608; G01B 11/10; G01B 11/105; G01B 11/14; G01B 11/2504; G01B 21/042; H04N 13/0246; H04N 1/00819; H04N 13/0425; H04N 2201/0448; H04N 1/047; H04N 1/0476; H04N 1/195; H04N 2201/04701; H04N 2201/04729; H04N 2201/04789; G06T 7/0018; G06T 7/002; G06T 2201/0601; G06T 2207/30204; G06T 2207/30208

See application file for complete search history.

(56) References Cited

U.S. PATENT DOCUMENTS 5,304,787 A * 4/1994 Wang ................ G06K 7/1093
235/462.09
5,550,362 A 8/1996 Sherman
(Continued)

FOREIGN PATENT DOCUMENTS

JP 2007-324655 A 12/2007
KR 10-2006-0065657 A 6/2006
(Continued)

OTHER PUBLICATIONS

Gremban et al., "Geometric Camera Calibration Using Systems of Linear Equations," 1988 IEEE International Conference on Robotics and Automation, pp. 562-567, Apr. 1988.
(Continued)

*Primary Examiner* — Suezu Ellis
(74) *Attorney, Agent, or Firm* — Stoel Rives LLP; Robert R. Teel

(57) ABSTRACT

Calibrating extrinsic parameters of an imaging system in an automated data reading system includes obtaining, from the imaging system, image data representing an imaged portion of a planar calibration target. The target is coupled to a housing of the automated data reading system and superimposed on a surface thereof. For example, the calibration target is placed on a conveyer surface, or it is printed on the (Continued)

housing of the automated data reading system. The imaged portion of the planar calibration target includes spaced-apart optical codes disposed at positions that coincide with predetermined locations of the automated data reading system to define known calibration-control points for the surface. Optical codes represented in the image data are decoded to obtain observed calibration-control points used for calibrating the extrinsic parameters based on differences between the known and observed locations of the calibration-control points.

23 Claims, 22 Drawing Sheets

(51) Int. Cl.
 *G06T 7/00* (2006.01)
 *G06K 7/015* (2006.01)

(56) References Cited

U.S. PATENT DOCUMENTS

| | | | | |
|---|---|---|---|---|
| 5,768,443 | A * | 6/1998 | Michael | G06T 7/002 382/151 |
| 6,301,396 | B1 * | 10/2001 | Michael | G06T 7/0018 382/151 |
| 6,336,587 | B1 | 1/2002 | He et al. | |
| 6,766,955 | B2 | 7/2004 | Patel et al. | |
| 6,824,058 | B2 | 11/2004 | Patel et al. | |
| 6,866,199 | B1 | 3/2005 | Keech et al. | |
| 7,287,699 | B2 | 10/2007 | Liu | |
| 7,527,207 | B2 | 5/2009 | Acosta et al. | |
| 7,557,835 | B2 | 7/2009 | Douret et al. | |
| 8,619,144 | B1 * | 12/2013 | Chang | H04N 17/002 348/180 |
| 9,230,326 | B1 * | 1/2016 | Liu | G06T 7/0018 |
| 2004/0211836 | A1 | 10/2004 | Patel et al. | |
| 2005/0270375 | A1 * | 12/2005 | Poulin | G06T 7/0057 348/187 |
| 2006/0088196 | A1 | 4/2006 | Popovich, Jr. et al. | |
| 2006/0261157 | A1 | 11/2006 | Ostrowski et al. | |
| 2007/0012789 | A1 | 1/2007 | Hartney et al. | |
| 2008/0143838 | A1 | 6/2008 | Nadabar et al. | |
| 2009/0026271 | A1 | 1/2009 | Drzymala et al. | |
| 2009/0095047 | A1 * | 4/2009 | Patel | G06K 7/10722 73/1.01 |
| 2009/0095814 | A1 | 4/2009 | Haggerty et al. | |
| 2010/0067072 | A1 * | 3/2010 | Lefevere | H04N 1/00002 358/504 |
| 2010/0116887 | A1 | 5/2010 | Barkan et al. | |
| 2010/0314448 | A1 | 12/2010 | Thuries et al. | |
| 2011/0316968 | A1 * | 12/2011 | Taguchi | H04N 5/23238 348/36 |
| 2012/0002304 | A1 * | 1/2012 | Taguchi | G02B 27/0012 359/727 |
| 2012/0187191 | A1 | 7/2012 | Olmstead | |
| 2012/0194791 | A1 * | 8/2012 | Duss | B41F 13/025 355/53 |
| 2014/0094939 | A1 * | 4/2014 | Pierce | G05B 19/054 700/66 |
| 2014/0184815 | A1 * | 7/2014 | Lin | H04N 17/002 348/188 |
| 2015/0009338 | A1 * | 1/2015 | Laffargue | G01F 25/0084 348/175 |

FOREIGN PATENT DOCUMENTS

| | | |
|---|---|---|
| KR | 10-2008-0053508 A | 6/2008 |
| WO | WO 2006/120685 A3 | 11/2006 |
| WO | WO 2007/038199 A1 | 4/2007 |

OTHER PUBLICATIONS

Heikkilä et al., "A Four-Step Camera Calibration Procedure with Implicit Image Correction," Conference on Computer Vision and Pattern Recognition, IEEE Computer Society, pp. 1106-1112, Jun. 17, 1997.

Heikkilä, "Geometric Camera Calibration Using Circular Control Points," IEEE Transactions on Pattern Analysis and Machine Intelligence, pp. 1066-1077, 2000.

Kannala, et al. "Geometric Camera Calibration," Wiley Encyclopedia of Computer Science and Engineering, pp. 1-20, Jan. 7, 2008.

Tsai, "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, pp. 323-344, Aug. 1987.

Wang et al., "Camera Calibration by Vanishing Lines for 3-D Computer Vision," IEEE Transactions on Pattern Analysis and Machine Intelligence, vol. 13, No. 4, pp. 370-376, Apr. 1991.

Zhang, "Flexible Camera Calibration by Viewing a Plane from Unknown Orientations," The Proceedings of the Seventh IEEE International Conference on Computer Vision, vol. 1, pp. 666-673, 1999.

Zollner et al., "Comparison of Methods for Geometric Camera Calibration Using Planar Calibration Targets," Proceedings of the 28th Workshop of the Austrian Association for Pattern Recognition, pp. 237-244, 2004.

Bouguet, "Camera Calibration Toolbox for Matlab," www.vision.caltech.edu/bouguet/calib_doc, Jul. 9, 2010.

International Searching Authority, International Search Report and Written Opinion for PCT/US2013/051872, Nov. 26, 2013.

\* cited by examiner

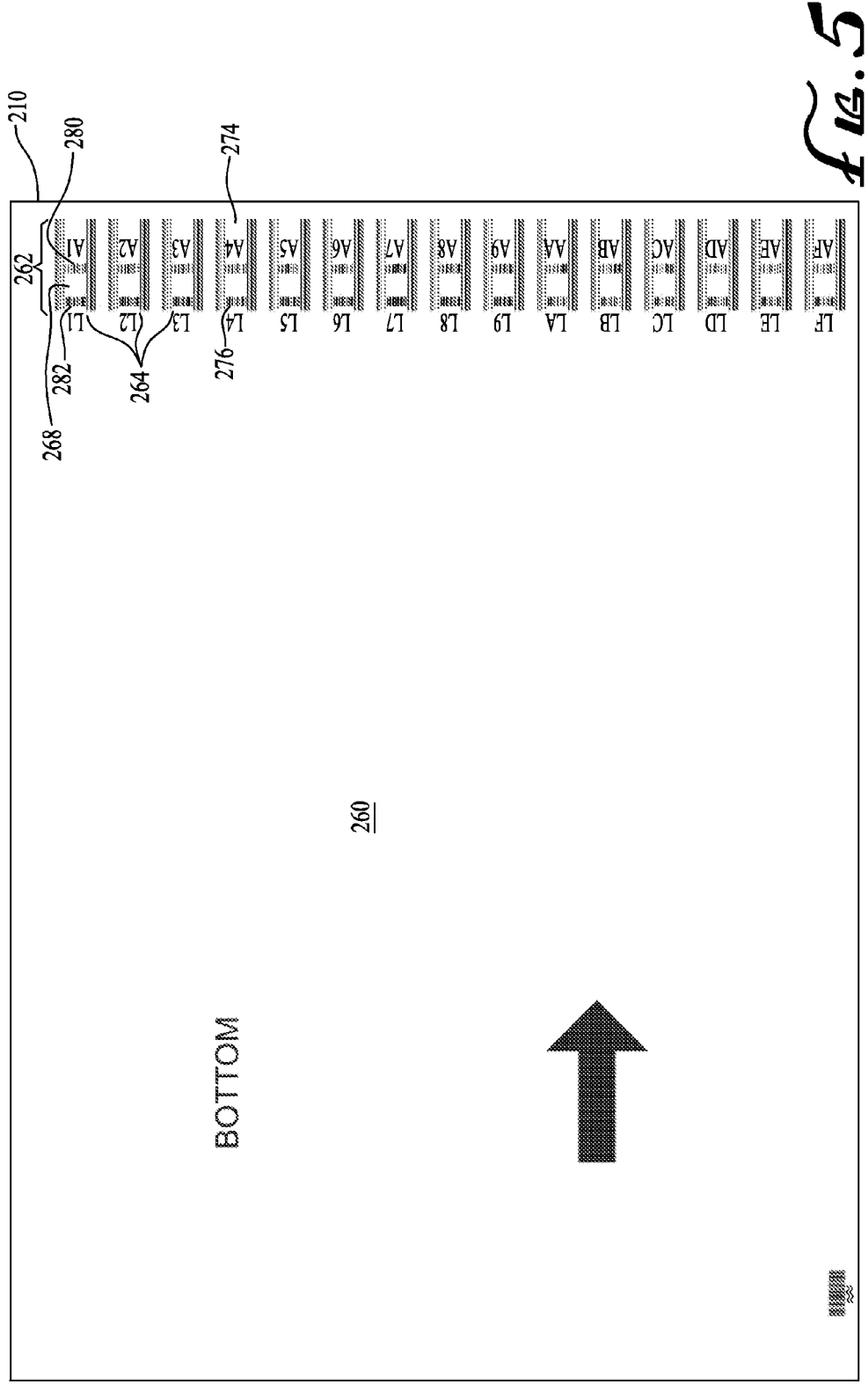

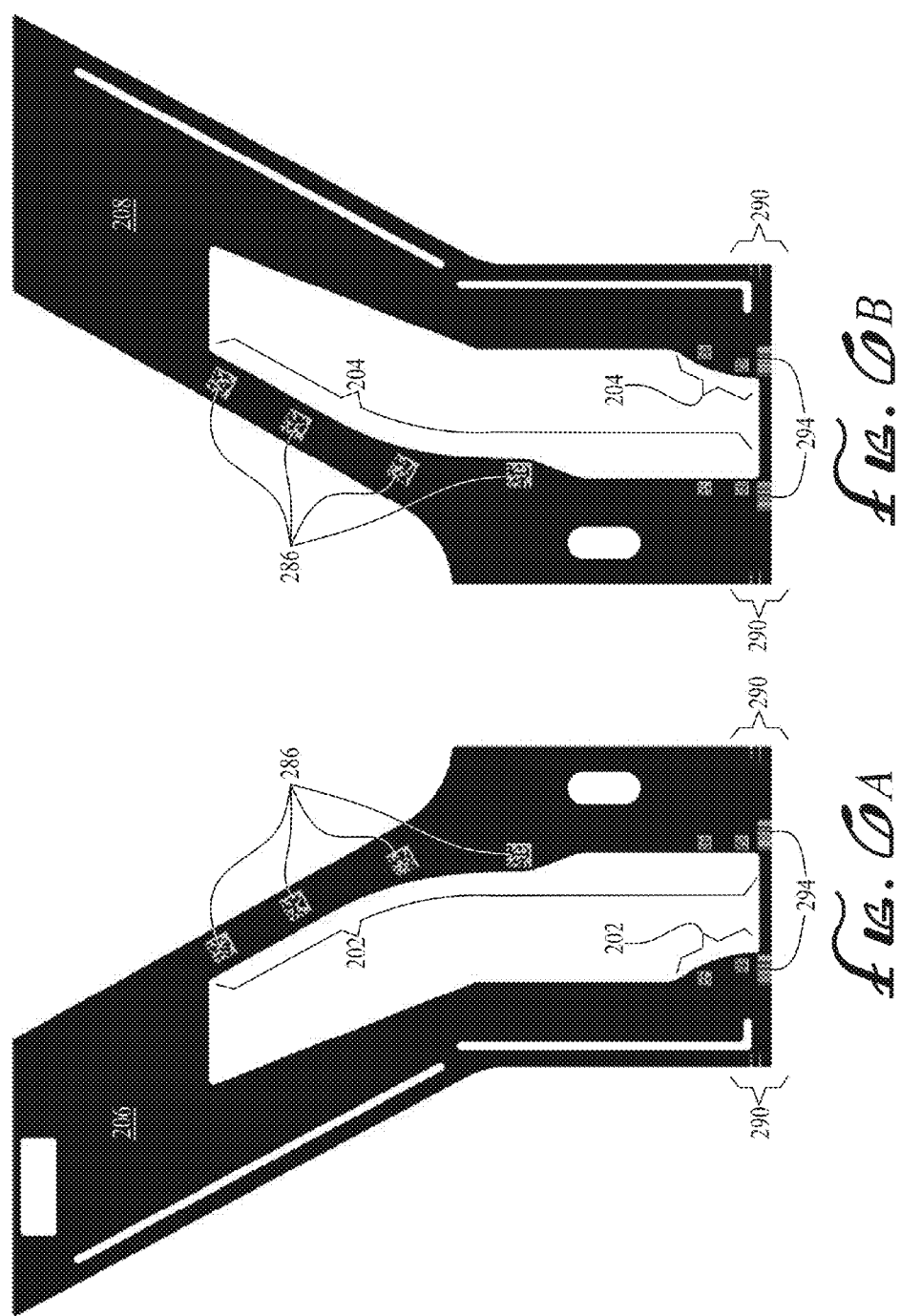

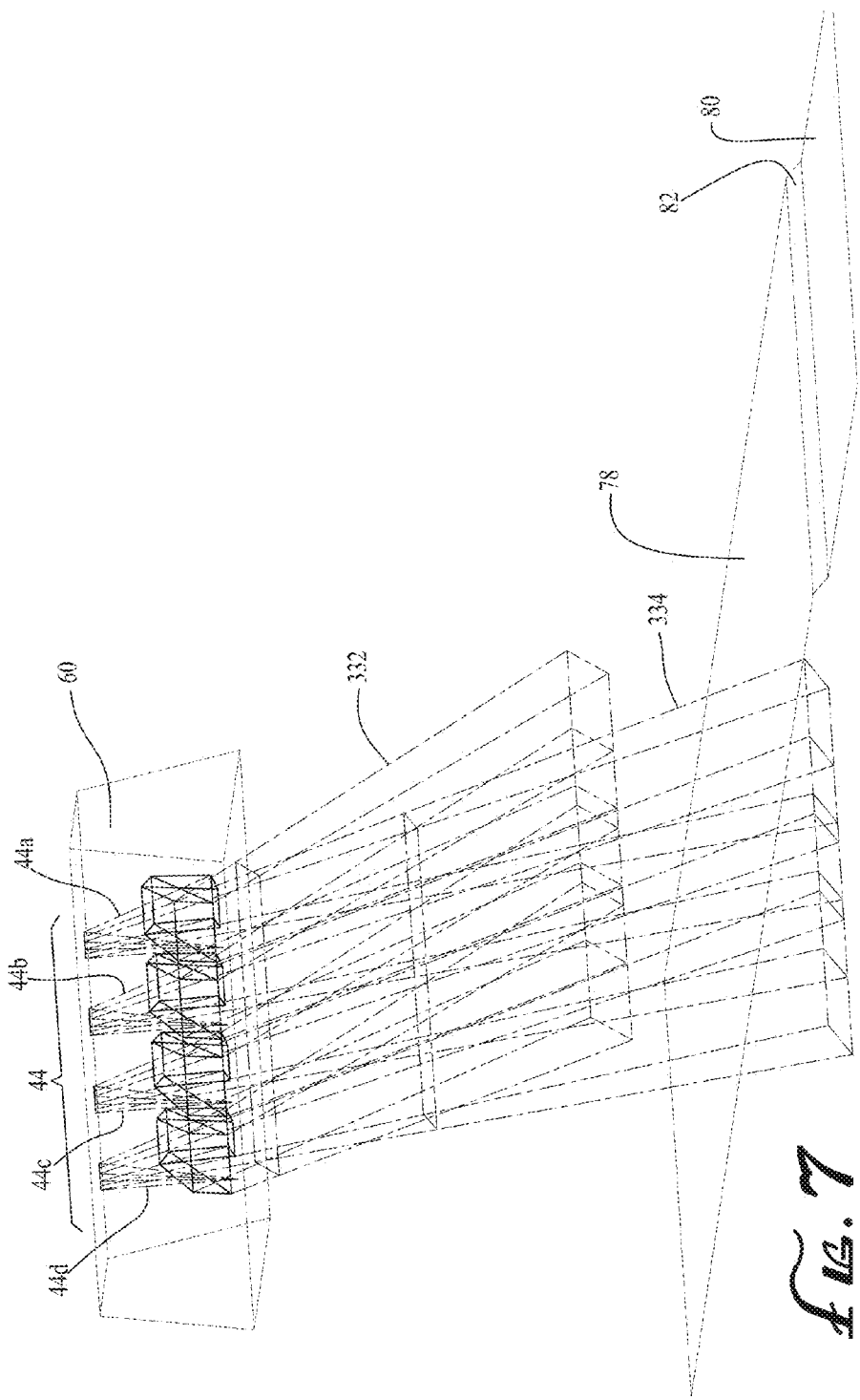

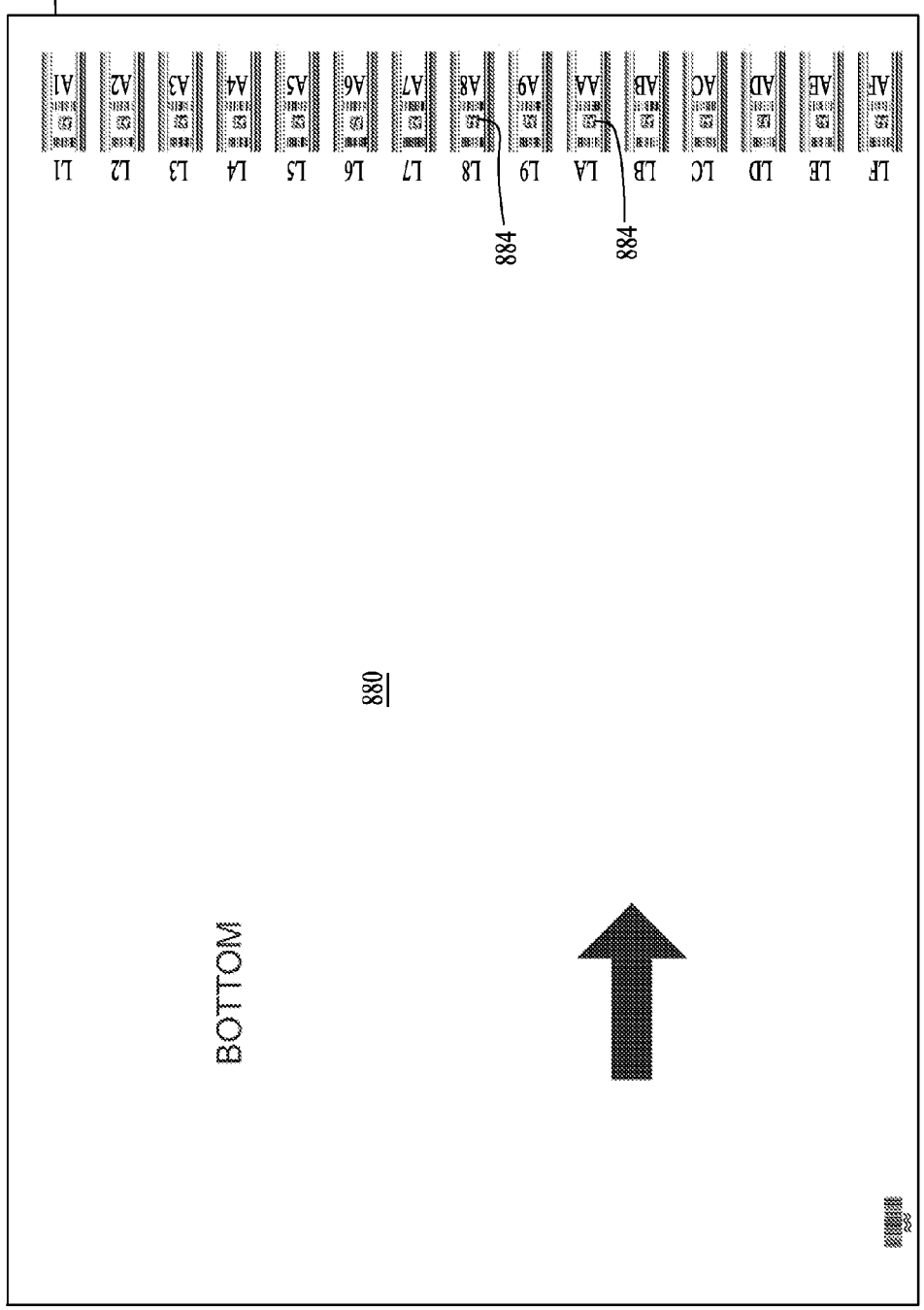

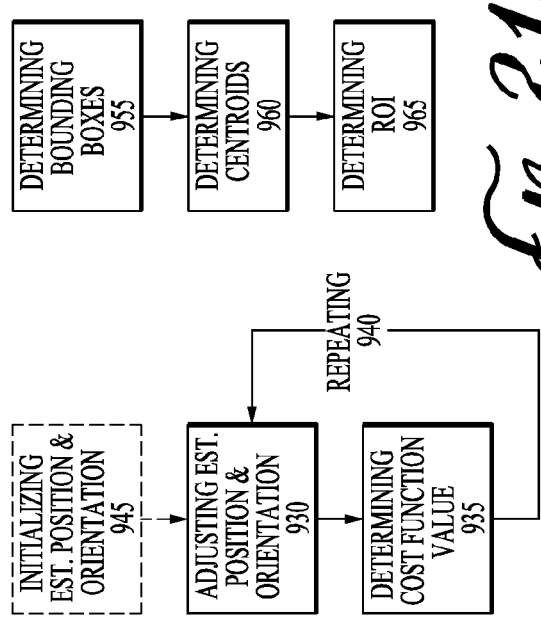
FIG. 21D
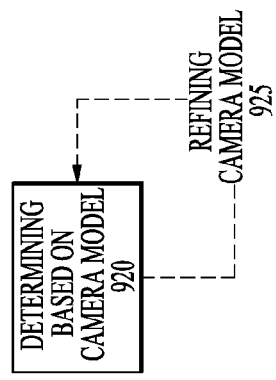
FIG. 21C
FIG. 21B
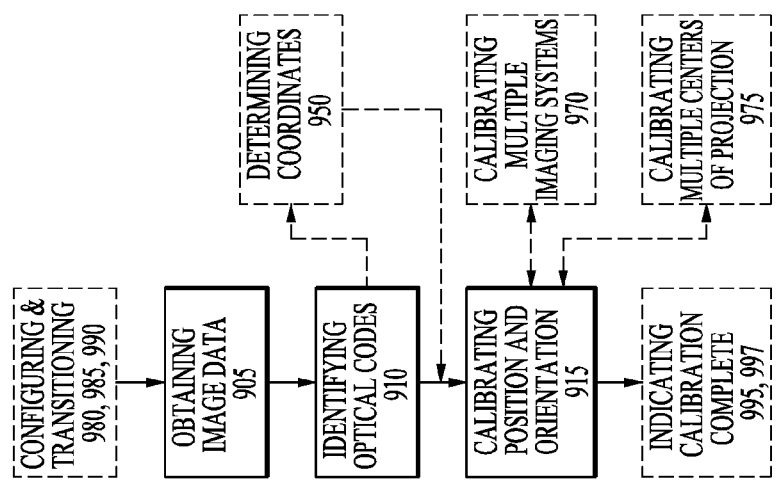
FIG. 21A

9,519,810 B2

CALIBRATION AND SELF-TEST IN AUTOMATED DATA READING SYSTEMS

RELATED APPLICATION

This application claims the benefit under 35 U.S.C. §119(e) of U.S. Provisional Patent Application No. 61/678,015, filed Jul. 31, 2012, which is hereby incorporated by reference in its entirety.

BACKGROUND INFORMATION

The field of this disclosure relates generally to systems and methods for automated data reading and, more particularly, to calibration and self-test in automated data reading systems.

Optical codes encode useful, optically readable information about items to which they are attached or otherwise associated. Optical codes are typically placed on items to help track item movement in industrial or shipping facilities, or to facilitate sales and monitor inventory at retail establishments. The optical codes are placed on or associated with items, packages, containers, or other objects, and read by data readers when the items bearing the optical codes are within the data reader's read zone during a data-reading operation. For example, in retail stores, data readers are placed at checkstands or are built into a checkstand counter and generally have one or more read volumes (scan volumes) that collectively establish a read zone in which optical codes may be successfully read.

Optical code readers acquire data from one-dimensional and two-dimensional optical codes or from other types of identifying indicia or symbols, such as biometric features. Two types of optical code readers used to acquire data associated with an optical code are laser scanners and imager-based optical code readers—the latter are also referred to as imaging readers. Both laser scanners and imaging readers are referred to more generally as scanners, data readers, or simply readers. Therefore, for purposes of this disclosure, the terms scan and read are used interchangeably to connote acquiring information associated with optical codes. Likewise, the terms scanner and reader are used interchangeably to connote devices that acquire data associated with optical codes, other symbols, or electromagnetic fields (e.g., radio-frequency identification or near field communication).

Although functionally similar to laser scanners, imaging readers employ a camera or an imaging system including an imager sensor array (imager) and associated optics (mirrors or lenses) to receive light reflected from an optical code and to generate image data (typically in digital form) representing the optical code. This application uses the terms camera and imaging system interchangeably to connote devices that receive light and produce image data used to locate and decode optical codes.

Data readers that read the information encoded in optical codes may be generally classified in one of three types: manual, semi-automatic, or automated readers. With manual or semi-automatic readers (e.g., a hand-held type reader, or a fixed-position reader), a human operator positions an item relative to the read zone for reading the optical code associated with the item. In an automated reader, such as a portal or tunnel scanner, a conveyor automatically positions the item relative to the read zone, e.g., transports the item through the read zone, so that the data reader can automatically read the optical code borne by the item while contemporaneously tracking the item using three-dimensional (3-D) machine vision techniques.

In 3-D machine vision, a camera (imaging system) is modeled as a ray-based sensing device with the camera's geometry controlling how observed rays of light are mapped onto an image plane. A camera model—typically a perspective projection camera model, also referred to as a pinhole camera model—provides a transformation that maps between the projection rays and image points. The transformation is refined by determining geometric properties of the camera in a process called geometric camera calibration, or simply calibration. Hence, a calibrated camera can be used as a direction sensor where both the forward-projection and back-projection transformations are determined, i.e., one may compute the image point corresponding to a given projection ray and vice versa.

A camera model generally contains two kinds of parameters: extrinsic parameters that relate the camera orientation and position with respect to a system coordinate frame, and intrinsic parameters that determine the projection from a camera coordinate frame onto image coordinates. In typical 3-D machine vision applications, both the external and internal camera parameters are determined during the calibration process.

Geometric camera calibration has conventionally included positioning a bulky calibration object having known geometric properties, calibrating an imaging system by imaging the object with the imaging system, and repositioning the object to another location suitable for calibrating a different imaging system. Previous calibration objects often included one to three planes that included rudimentary geometric shapes to provide features (e.g., corner locations) establishing calibration-control points, i.e., known system-coordinate locations. From those rudimentary geometric shapes, measured locations of the features were extracted from image data and attempts were made to fit the measured locations of the image data to the calibration-control points based on a camera model. These previous attempts typically either ignored errors attributable to the extraction step, the repositioning process, and inconsistencies in the shape of the target, or included additional remediation techniques to reduce the effects of these error sources.

SUMMARY OF THE DISCLOSURE

Systems and methods are described for calibrating extrinsic parameters of an imaging system in an automated data reading system. One embodiment includes obtaining, from the imaging system, image data representing an imaged portion of a planar calibration target. The target is generally coupled to a housing of the automated data reading system and superimposed on a surface thereof (e.g., a conveyer surface). The imaged portion of the planar calibration target includes spaced-apart optical codes disposed at locations that coincide with predetermined locations of the automated data reading system to define known locations of calibration-control points for the surface. The embodiment includes identifying (e.g., during a decode process) the optical codes represented in the image data to obtain observed locations of the calibration-control points, and calibrating the extrinsic parameters based on differences between the known and observed locations of the calibration-control points.

In another embodiment, a multi-plane calibration system is configured to provide contemporaneous calibration of multiple imaging systems positioned around a read zone of an automated data reading system. The multi-plane calibration system includes a freestanding template having calibration optical codes on its opposing sides, and the freestanding template is configured to mechanically engage a housing of the automated data reading system so that the calibration optical codes are located at positions that are known with respect to the automated data reading system. In some embodiments, the calibration optical codes are printed on sidewalls of the housing itself at positions that are known with respect to the automated data reading system.

In yet another embodiment, a self-test system for an automated data reader comprises optical codes coupled to sidewalls of a housing of the automated data reader. The optical codes are undecodable in a normal mode and decodable in a self-test or calibration mode.

Additional aspects and advantages will be apparent from the following detailed description of preferred embodiments, which proceeds with reference to the accompanying drawings.

BRIEF DESCRIPTION OF THE DRAWINGS

Embodiments are described below with reference to accompanying drawings; however, the accompanying drawings depict only certain embodiments and are therefore not intended to limit the teachings of this disclosure.

FIG. 5 is a rendering of an opposing bottom surface of the calibration target of FIGS. 3 and 4.

FIG. 6A is a rendering of optical codes printed on an inlet data capture arch housing section surface to define a calibration target that confronts a read zone, according to a second embodiment.

FIG. 6B is a rendering of optical codes printed on an outlet data capture arch housing section surface to define a calibration target that confronts a read zone, according to the second embodiment.

FIG. 7 is an isometric view of dual fields of view generated by imaging systems of FIGS. 1-3.

FIG. 20 is a rendering of an opposing bottom surface of the calibration target of FIGS. 3 and 4, according to another embodiment.

FIG. 21A is a flowchart showing a method of calibrating position and orientation parameters of an imaging system in an automated data reading system.

FIG. 21B is a flowchart showing, in greater detail, a calibration method.

FIG. 21C is a flowchart showing, in greater detail, a camera-model refinement method.

FIG. 21D is a flowchart showing, in greater detail, a method of determining coordinates of an optical code.

DETAILED DESCRIPTION OF EMBODIMENTS

Figure 1:
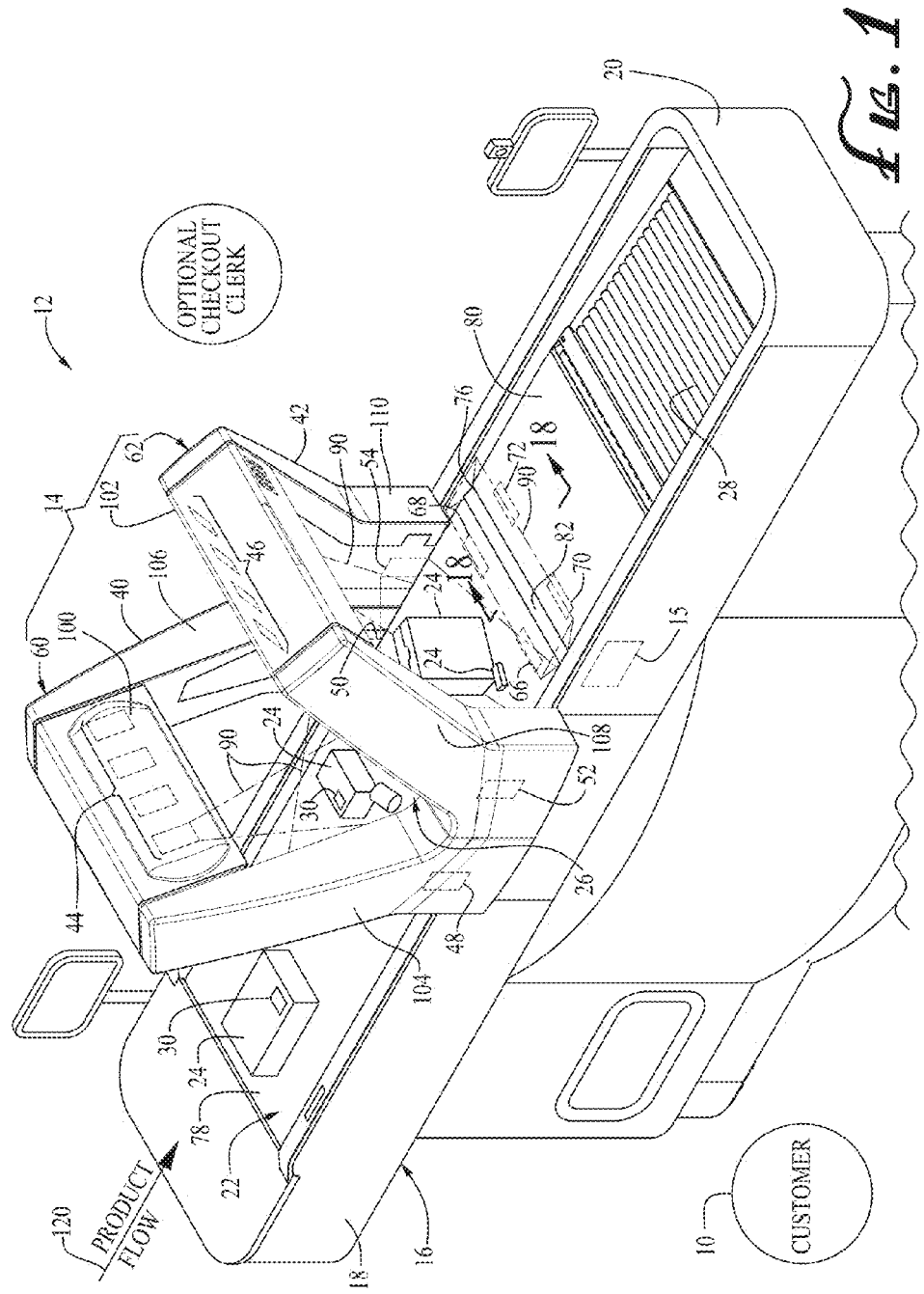
FIG. 1 is an isometric view of an automated data reading system operable to read optical codes of items being passed by a conveyor system through a read zone.

Shown from a point of egress of a customer 10, FIG. 1 is an isometric view of an automated data reading system 12 (or simply, system 12). The system 12 includes an upper data reader 14 and a lower data reader 15 (collectively, reader 14/15) installed in a checkout system 16. The checkout system 16 includes an inlet end 18, an outlet end 20, and a conveyor system 22 for conveying items 24 (e.g., merchandise) from the inlet end 18, through a three-dimensional volume (referred to as a read zone 26) of the reader 14/15, and to the outlet end 20 that includes a bagging area 28. While the items 24 are positioned in the read zone 26, the reader 14/15 reads optical codes 30 or other identifying information borne by the items 24, decodes that information, and identifies the items 24 based on the decoded information.

The reader 14/15 has an inlet housing section 40 and an outlet housing section 42 that support overhead imaging systems 44 and 46, and lateral imaging systems 48, 50, 52, and 54. The housing sections 40 and 42 define, respectively, an inlet data capture arch 60 and an outlet data capture arch 62 located over the conveyor system 22. Although the housing sections 40 and 42 include an open space between them, in other embodiments a portal reader may be embodied in an elongate tunnel formed over the conveyor system 22. Four additional bottom-surface imaging systems 66, 68, 70, and 72 are positioned below the conveyor system 22, bordering a gap 76 between an inlet conveyor section 78 and an outlet conveyor section 80. A transparent transition plate 82 is mounted in the gap 76 so that the imaging systems 66, 68, 70, and 72 may acquire image data from bottom surfaces of the items 24 as they slide over the transition plate 82.

The multiple imaging systems (also referred to as image capture devices, or simply imagers) of the reader 14/15 are positioned at different locations along the conveyor system 22 to provide different fields of view 90 for the read zone 26. For example, the sixteen imaging systems are located as follows: the four imaging systems 44 are positioned along a top portion 100 of the arch 60; the four imaging systems 46 are positioned along a top portion 102 of the arch 62; the imaging system 48 is positioned along side arm 104 of the arch 60; the imaging system 50 is positioned along side arm 106 of the arch 60; the imaging system 52 is positioned along side arm 108 of the arch 62; the imaging system 54 is positioned along side arm 110 of the arch 62; two of the four bottom-surface imaging systems 66 and 68 are positioned below the inlet conveyor section 78 toward the inlet end 18 side of the gap 76; and the other two bottom-surface imaging systems 70 and 72 are positioned below the outlet conveyor section 80 toward the outlet end 20 side of the gap 76.

The arrangement of imaging systems described above and the positioning, tracking, and identification systems set forth below are example configurations; various other configurations are also possible and contemplated. Additional details of the system 12 are described in U.S. patent application Ser. No. 13/357,356, titled "Tunnel or Portal Scanner and Method of Scanning for Automated Checkout," now U.S. Patent Application Publication No. 2013/0020392.

To automatically move items along a transport path 120 through the read zone 26, the conveyor system 22 may include one or more suitable types of mechanical transport systems. For example, the conveyor system 22 includes the inlet conveyor section 78 and the outlet conveyor section 80 with corresponding driving mechanisms to automatically move the items 24 placed on the conveyor system 22 along the transport path 120.

To automatically track the items 24, the system 12, for example, includes conveyor-speed encoders that provide for calculation of a dead-reckoning location of the items 24. The reader 14/15 may alternatively or additionally include optical detectors 130 (FIG. 2) on the arches 60 and 62, or at other locations to provide dimensional information for the items 24.

To automatically identify the items 24, the reader 14/15, which may be an optical code reader, is operable to obtain image data representing optical codes, such as the optical codes 30, imaged within the fields of view 90. The reader 14/15 identifies the items 24 based on the image, positional, and dimensional data representing each of the items 24 that the conveyor system 22 transports through the read zone 26. In a successful identification operation, the reader 14/15 images and reads an optical code, converts features of the optical code from image-coordinate locations to system-coordinate locations using a back-projection transformation described below, and confidently associates the system-coordinate locations of the decoded optical code with system-coordinate locations of a three-dimensional model of an item.

Figure 2:
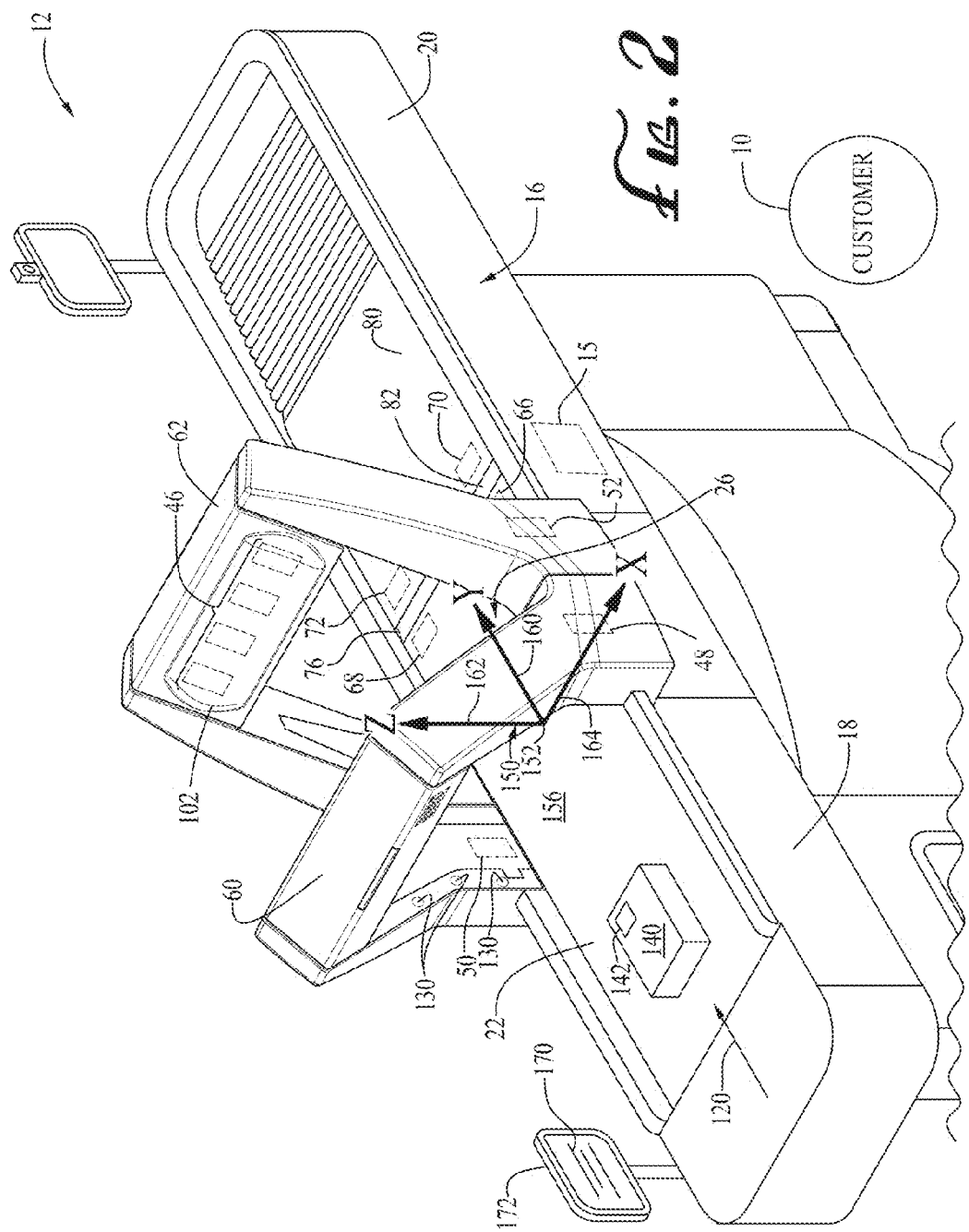
FIG. 2 is an isometric view of the automated data reading system of FIG. 1 as viewed from a customer's point of ingress, and showing a system coordinate frame.

As shown in FIG. 2, as an item 140 is moved, its optical code 142 is located by converting image-coordinate locations of the optical code 142 into terms of a system coordinate frame 150 having an origin 152 centered between the arches 60 and 62 on a conveyor surface 156 of the inlet conveyor section 78. The system coordinate frame 150 includes a Y-axis 160 parallel to the transport path 120, a Z-axis 162 normal to the conveyor surface 156, and an X-axis 164 extending laterally across the conveyor surface 156. Because the location and dimensions of the item 140 are also detected (e.g., by the detectors 130), the three-dimensional model of the item 140 may be constructed and tracked (in terms of system coordinates) while the item 140 is transported through the read zone 26. A pinhole camera model may then be used to back-project an image-coordinate location of the optical code into a system-coordinate location of the optical code. The back-projected system-coordinate location of the optical code is correlated with the three-dimensional model of the item 140. The back projection rays thereby facilitate association of the optical code 142 with the three-dimensional model of the item 140. A close correlation produces a single identification of the item 140. Each successfully identified item is then optionally added to the item transaction list 170, which is presented on an inlet display 172, for example.

The pinhole camera model includes one or more sets of extrinsic parameters (position and orientation) for a particular imaging system. Accurately calibrated extrinsic parameters improve the accuracy of coordinate conversion results and therefore facilitate accurate association of optical codes to items transported through the read zone 26. The present inventor has recognized that bulky calibration targets introduce operational and systemic errors into the calibration process. For example, volumetric calibration objects are difficult to precisely position in known locations on an automated data reader, as they often have multiple planes with imprecise dimensions or orientations that skew locations of calibration-control points with respect to the system 12. Additionally, bulky calibration objects may use complicated setup or repositioning techniques during the calibration process, particularly in automated data reading systems with adjustable focal lengths. Previous calibration objects also included features that are not always precisely discernible, or may interfere with the decode process during subsequent (normal) operation of an automated data reading system. Additionally, the planar calibration object is low-cost, easy to maintain, and easy to service and can be stowed or folded in less space.

Figure 3:
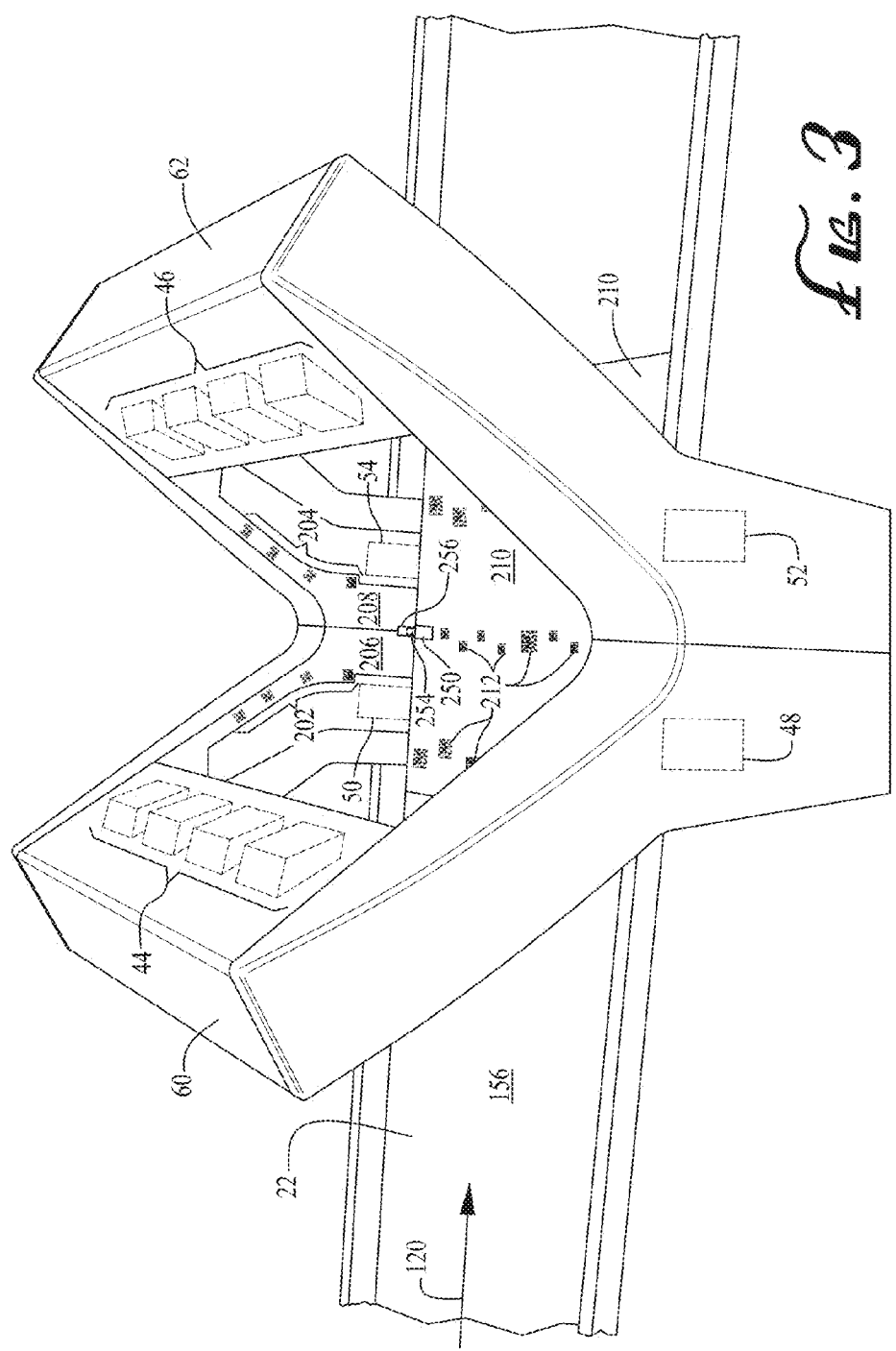
FIG. 3 is a perspective view of a fragment of the automated data reading system of FIG. 1, showing embodiments of calibration targets coupled to the automated data reading system and superimposed on surfaces thereof.

In one embodiment, extrinsic parameters are calibrated using a planar calibration target coupled to the system 12, i.e., in a fixed position directly on a surface of the system 12. For example, FIG. 3 shows two examples of such planar calibration targets: first, patterns 202 and 204 of optical codes printed on respective read-zone confronting surfaces 206 and 208 of the arches 60 and 62; and second, a freestanding calibration template 210 placed onto the conveyor surface 156. In this disclosure, freestanding calibration template means a sheet, mat, or other suitable planar object having mechanical properties that permit manipulation such as rolling and unrolling in sheet form, sliding or otherwise positioning in rigid form, or folding and bending in flexible form.

The calibration patterns 202 and 204 and template 210 are superimposed on surfaces so that regions of the targets have spaced-apart optical codes that are visible to various imaging systems' fields of view 90 (FIG. 1). The optical codes are disposed at locations that coincide with predetermined locations of the system 12 to define known calibration-control points. These targets are also suitable both for self-check and for calibration purposes, and may be used to concurrently calibrate multiple imaging systems oriented in several different planes around the read zone 26.

Figure 4:
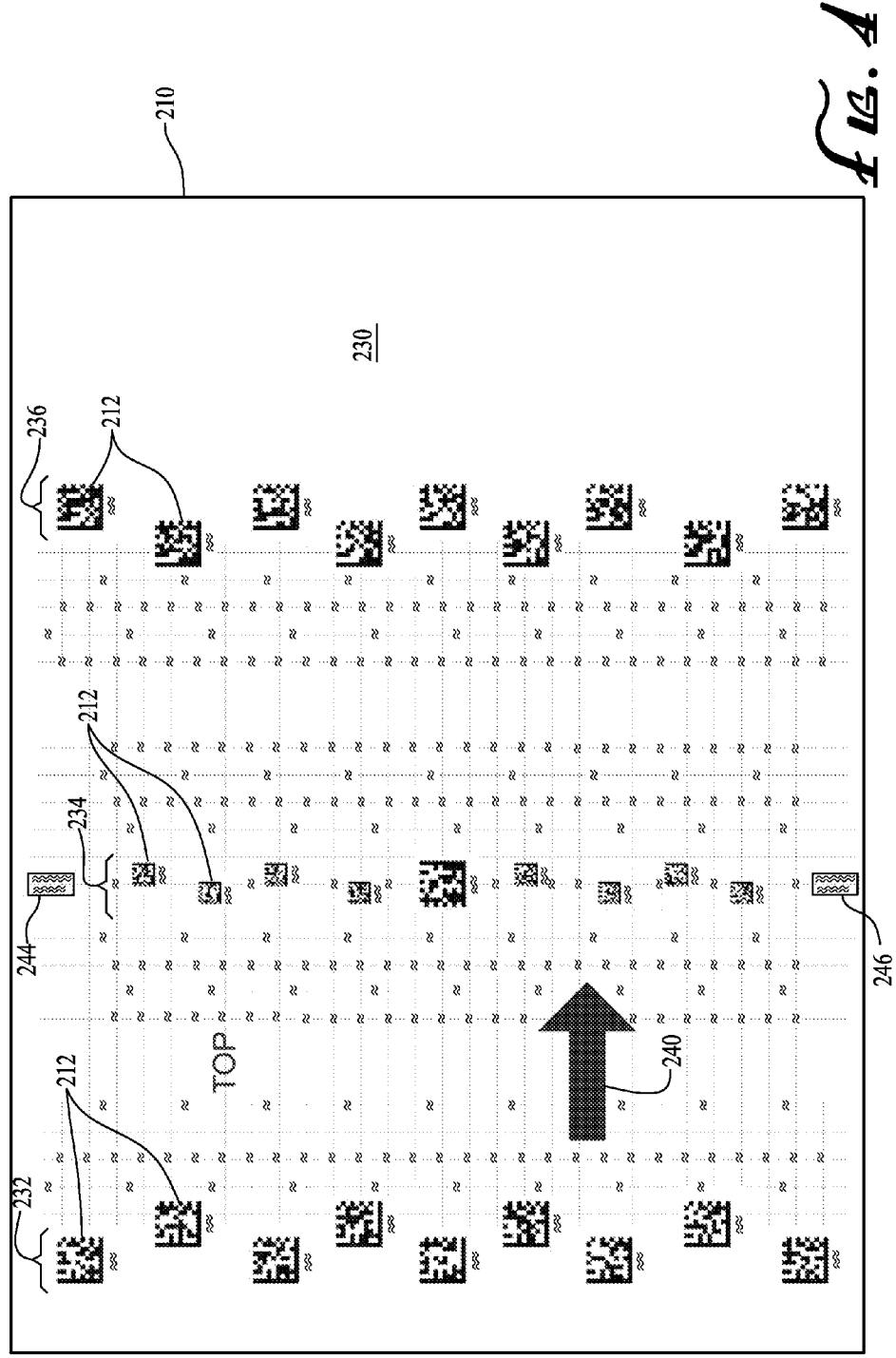
FIG. 4 is a rendering of a top surface of a calibration target of FIG. 3, according to a first embodiment.

FIG. 4 shows a top surface 230 of the template 210. The optical codes 212 of the surface 230 are 2-D Data Matrix codes generally arranged in a first column 232, a second column 234, and a third column 236. The columns 232, 234, and 236 each extend laterally across the conveyor surface 156, in a direction that is parallel with the X-axis 164 (FIG. 2) when the template 210 is placed on the conveyor surface 156. In each of the columns 232, 234, and 236, the optical codes 212 are mutually spaced-apart with respect to the X-axis 164, and adjacent optical codes within a column have locations that vary with respect to the Y-axis 160 (FIG. 2). When the template 210 is placed on the conveyor surface 156, the optical codes 212 are located at known system-coordinate locations, with three different adjacent optical codes 212 viewable by each field of view 90 from the overhead imaging systems 44 and 46.

Figure 4A:
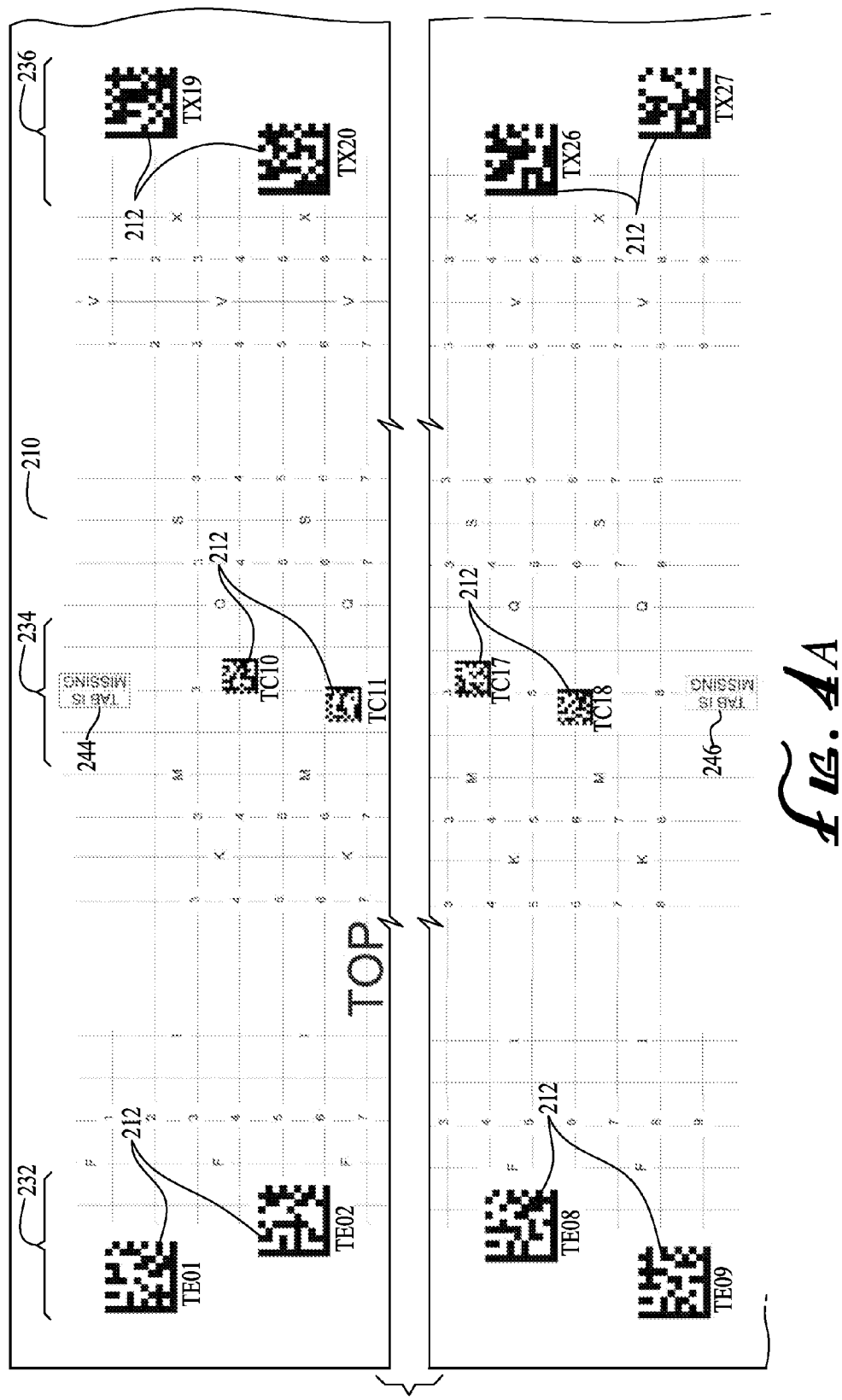
FIG. 4A is an enlarged fragmentary view of the rendering of FIG. 4.
Figure 16A:
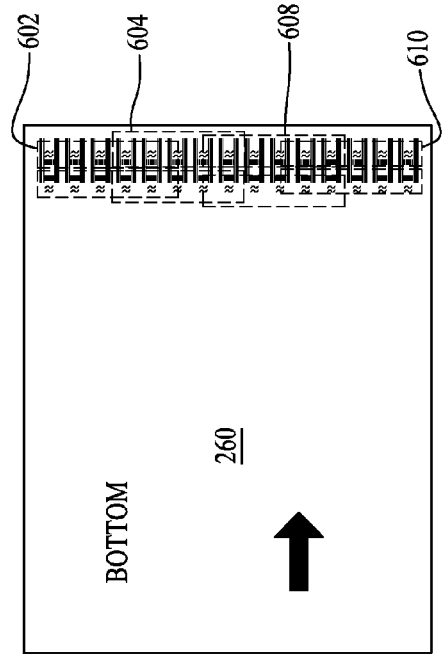
FIG. 16A is a rendering of the bottom surface of FIG. 5 that is annotated to show the fields of view of FIG. 15.
Figure 16B:
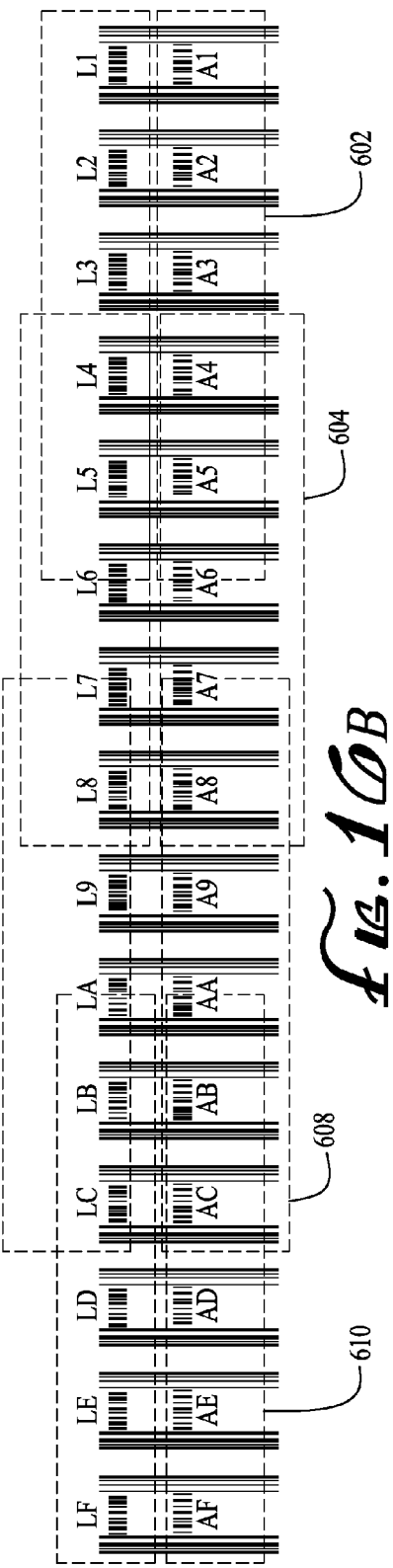
FIG. 16B is an enlarged view of optical codes and fields of view shown in FIG. 16A.

For discussion purposes, reference text printed on the template 210 is simplified as wavy lines in FIGS. 4, 5, 16A, and 20. Enlarged fragmentary portions of template 210 in FIGS. 4A and 16B show details of the reference text. Reference text printed alongside the optical codes 212, such as reference text TE02, facilitates placement of the template 210 with respect to the system 12. Additionally, the text and reference grid also facilitate troubleshooting. For example, the "TE" letters prefacing the labels of the optical codes 212 in the first column 232 mean that the optical codes 212 should be located toward the entry of the read zone 26 (under the arch 60) when the template 210 is correctly positioned. Similarly, the "TC" letters indicate the optical codes 212 in the second column 234 should have a central location, and "TX" means the optical codes 212 of the third column 236 should have an exit location. A large arrow 240 also facilitates placement of the template 210 by indicating the direction of the transport path 120 when the template 210 is deployed on the conveyor surface 156.

Lateral tab missing indicators 244 and 246 are printed on the template 210 to indicate a tab 250 (FIG. 3) should be slipped over the template 210 in order to conceal the indicators 244 and 246. In other words, if the "TAB MISSING" text is uncovered and viewable by a user, the user knows that the tab 250 is misplaced or not located in the designated position for properly aligning the template 210 with the system 12. The tab 250 includes a peg 254 that fits into a groove 256 between the housing sections 40 and 42 when the template 210 is deployed. The tabs 250 (an opposing tab is implied by symmetry) provide a keyed portion of the template 210 to aid in precisely positioning the template 210 with respect to the system 12. Other keyed shapes and techniques to couple templates to surfaces of a data reader may be employed. For example, detents or magnets may be used, or tabs and voids may be formed directly from the perimeter of the template 210 to receive pegs projecting from the housing sections 40 and 42.

FIG. 5 shows a bottom surface 260 of the template 210. The bottom surface includes one column 262 of linear codes 264. The column 262 aligns with the gap 76 (FIG. 1) and confronts the transition plate 82 when the template 210 is deployed (superimposed on the conveyor surface 156). The linear codes 264 each include central redacted boxes 268 and redacted end portions 274 and 276 that provide two decodable regions 280 and 282 for each code 264. As explained below, the decodable regions 280 and 282 calibrate bottom-surface imaging systems on opposing sides of the gap 76. The redacted boxes 268 and portions 274 and 276 inhibit unintended redundant decodes of the linear codes 264 resulting from light refracted by the transition plate 82.

FIGS. 6A and 6B show in greater detail the patterns 202 and 204 of optical codes 286 printed on respective read-zone confronting surfaces 206 and 208 of the arches 60 and 62. The optical codes 286 are modified Data Matrix-type codes with modifications that inhibit the reader 14/15 from detecting the optical codes 286 while the reader is configured in a normal operating mode for detecting optical codes on items 24 (FIG. 1) in the read zone 26. One such modification includes the optical codes 286 having cells (also called modules) that are color-inverted, or having other illegal patterns. Illegal patterns are defined as patterns in the optical codes that are normally not detected or decodable. For example, normally black cells are printed as white, and normally white cells are printed as black. Additionally, the optical codes 286 are mirrored about a vertical centerline or a horizontal centerline. Other modifications and combinations of modifications that create illegal patterns are also possible. For example, the optical codes 286 may be printed on the surfaces 206 and 208 using infrared reflective or infrared transmitting pigments. Such pigments may not be readily detected by imaging systems in the normal operating mode configured to illuminate the read zone 26 with light in the visible spectrum. But the pigments may be detectable in a calibration mode by using illumination such as infrared or visible artificial illumination to reflect or backlight the optical codes 286 and receiving the infrared light from the pigments. In other embodiments, the reader 14/15 may also be configured to adjust exposure settings (e.g., gain control, shutter speed, aperture) or illumination brightness so that the optical codes 286 (including legal codes) are detected in calibration mode and undetected in normal mode, thereby allowing a reader to avoid using processing time attempting to decode calibration optical codes during a normal operating mode.

The confronting surfaces 206 and 208 also include conveyor belt alignment marks 290 and belt-height self-check linear codes 294. The belt alignment marks 290 provide a technician with a visual indicator of the preferred belt height for the conveyor system 22 (FIGS. 1-3). When the belt is properly adjusted, the self-check linear codes 294 are occluded by the belt and not decodable, but the self-check linear codes 294 are decodable when the belt is too low. If the system 12 images and decodes any portion of the self-check linear codes 294, an alert may be generated for a technician to properly adjust the belt height so that the linear codes 294 are no longer decodable. Likewise, the optical codes 286 may also be used for self-check purposes. For example, if the optical codes 286 are decodable (i.e., while illegal patterns are allowed by the system), the reader 14/15 may confirm that the imaging systems are not occluded, the exposure settings are configured, illumination is on, or the decode modules are operational.

Other types of codes and arrangements of optical codes may be possible. The system 12 and its associated subsystems may include decoders (e.g., software algorithms, hardware constructs) to decode various types of optical codes, such as one-dimensional (linear) codes (e.g., UPC, codabar, code 25, code 39, code 93, code 128, code 11, EAN8, EAN13, plessey, POSTNET), stacked linear codes (e.g., GS1 Databar, PDF417), and two-dimensional codes (e.g., aztec code, maxicode, QR code, high-capacity color barcode, Data Matrix).

Figure 8:
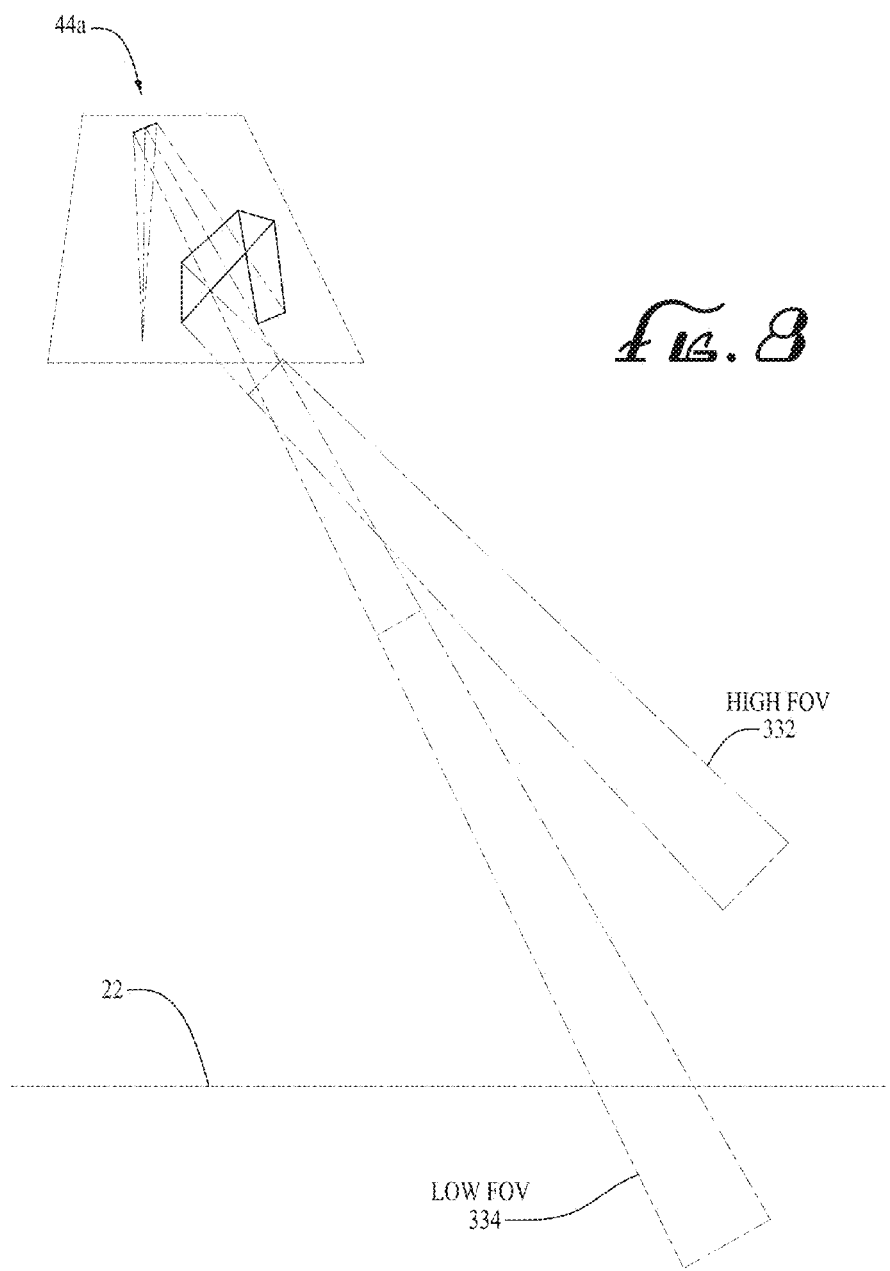
FIG. 8 is a side elevation view of dual fields of view generated by imaging systems of FIGS. 1-3.

Imaging systems may include light-directing optics to split a single field of view of a camera or an imager into two or more views. Therefore, each view may have its own extrinsic parameters to transform between image-coordinate and system-coordinate locations for that particular field of view. For example, FIGS. 7 and 8 are, respectively, isometric and side elevation views of the imaging system 44, which is collectively formed from four overhead imaging systems 44a, 44b, 44c, and 44d. Each imaging system 44a-d has a field of view that is split into a high field of view and a low field of view. For the imaging system 44a, a high field of view 332 and a low field of view 334 are denoted with reference numbers.

Figure 9B:
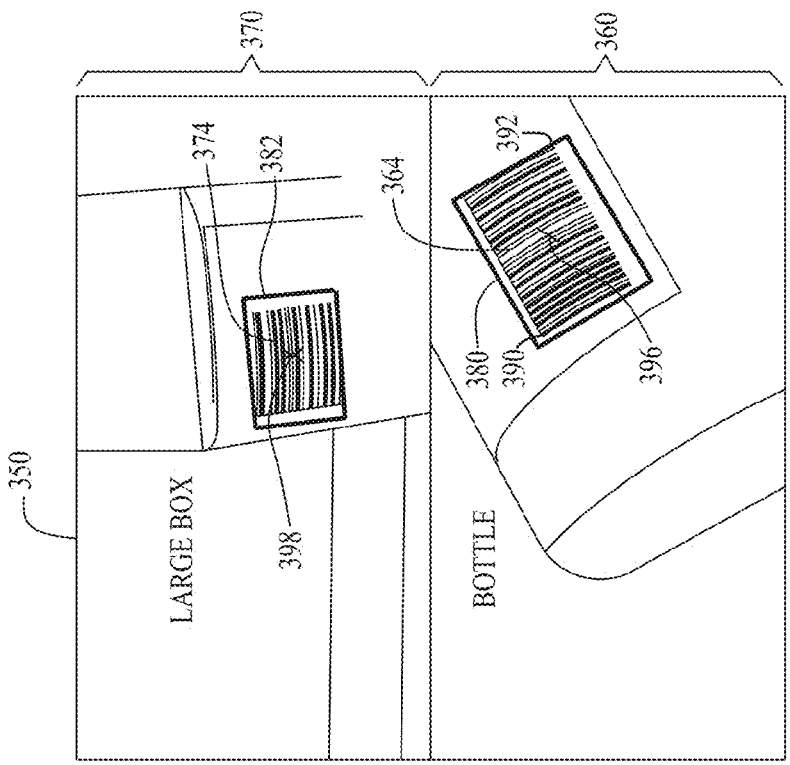
FIG. 9B is a rendering of an image captured by an overhead imaging system of FIGS. 1-3.
Figure 9A:
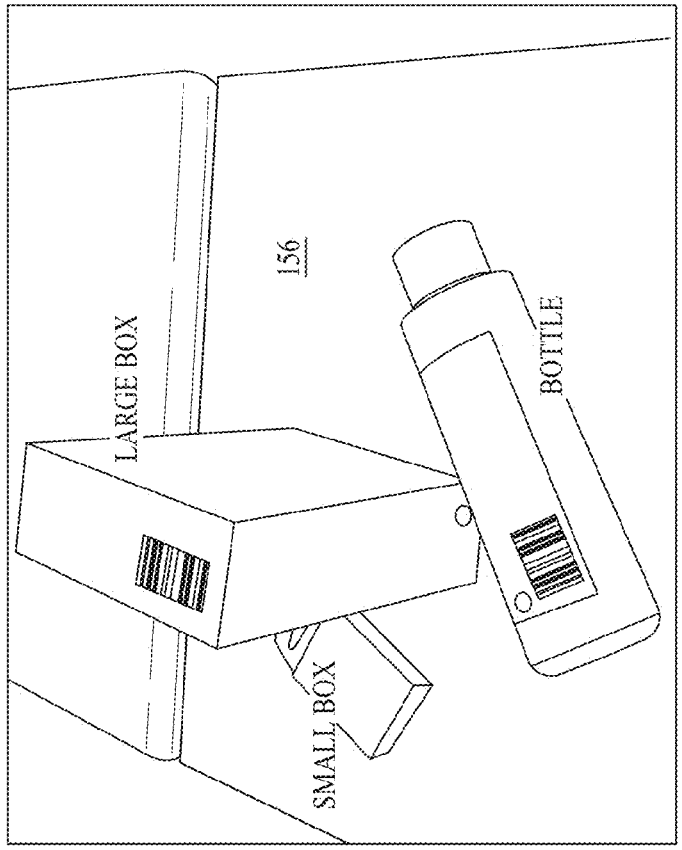
FIG. 9A is a rendering of an image of items on a conveyor of the automated data reading system of FIG. 1.

With split fields of view, an imaging system, such as the imaging system 44a, captures multiple spaced-apart regions in one frame of image data. The spaced-apart regions may be regions of the planar calibration targets or, in operation, optical codes for several spaced-apart items on the conveyor system 22. For example, FIG. 9A is a rendering of a small box, a large box, and a bottle on the conveyor surface 156 of the conveyor system 22. FIG. 9B is a rendering of an image 350 corresponding to an image of the items of FIG. 9A captured by the imaging systems 44a. The low field of view 334 (FIG. 8) captures, in a bottom half 360 of the image 350, an optical code 364 on the bottle, and the high field of view 332 (FIG. 8) captures, in a top half 370 of image 350, an optical code 374 on the large box. Details of the imaging systems are further described in the U.S. patent application Ser. No. 13/357,356 referenced previously.

Once optical codes are captured in an image, the reader 14/15 reads and decodes optical codes that have an acceptable quality (e.g., resolution, size). In some embodiments, the reader 14/15 also computes a bounding box that defines a quadrilateral perimeter surrounding the imaged portion of the optical code. For example, bounding boxes 380 and 382 are shown surrounding the optical codes 364 and 374 in FIG. 9B. To construct a bounding box, the reader 14/15 locates a contiguous start module and a contiguous stop module, such as start and stop modules 390 and 392 of the optical code 364. The distal portions of these modules 390 and 392 define corners (or vertices) of the bounding box 380. In some embodiments, the vertices may be selected at locations to produce a margin around the optical code. For example, the bounding boxes 380 and 382 are approximately ten percent longer than the length of the optical codes 364 and 374. Based on the four corners, the reader 14/15 computes a centroid, such as a centroid 396 or a centroid 398. The reader 14/15 can then determine system-coordinate locations of optical codes by back-projecting, from projection centers, rays extending from image-coordinate locations of centroids, corners, or other features of the bounding boxes into the read zone 26.

Figure 10:
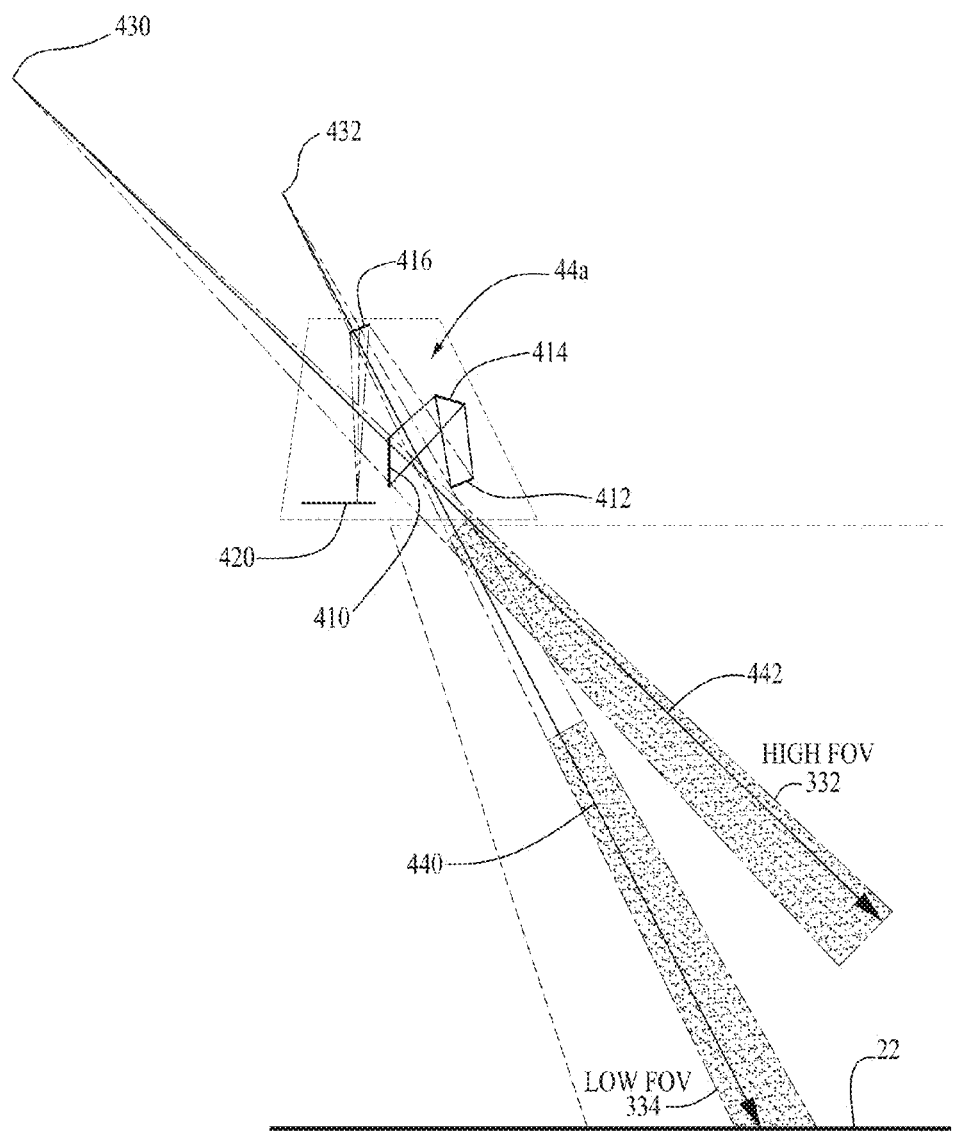
FIG. 10 is a side elevation view of an overhead imaging system of FIGS. 1-3, showing its two fields of view with corresponding projection centers, and showing back projection rays from the projection centers to a system-coordinate location.

FIG. 10 is a side elevation view of the imaging system 44a that captured the image of FIG. 9B. The imaging system 44a includes mirrors 410, 412, 414, and 416 that direct light from read zone 26 to an imager sensor 420. As noted above, mirrors 410, 412, 414, and 416 are arranged to provide two fields of view for the imager sensor 420. Mirrors 410, 412, 414, and 416 fold or reflect light, and it should be understood that the arrangement (e.g., location, aim) of mirrors 410, 412, 414, and 416 can be used to model the fields of view as projection centers 430 and 432. The projection center 432 is located at the convergence point of the low field of view 334, and the projection center 430 is located at the convergence point of the high field of view 332. FIG. 10 also depicts a back projection ray 440 corresponding to the centroid 396 (FIG. 9B) of the optical code 364, and a back projection ray 442 corresponding to the centroid 398 of the optical code 374. The back projection rays 440 and 442 extend from image-coordinate locations at projection centers 430, 432 into system-coordinate locations in the read zone 26. In other words, the physical locations of the optical codes 364 and 374 lie along their corresponding back projection rays 440 and 442.

To compute back projection rays 440 and 442, according to one embodiment, the reader 14/15 uses a pinhole camera model having calibrated extrinsic parameters information. The following example demonstrates a method in which back projection rays may be iteratively optimized to develop a pinhole camera model with accurate extrinsic parameters.

Figure 11:
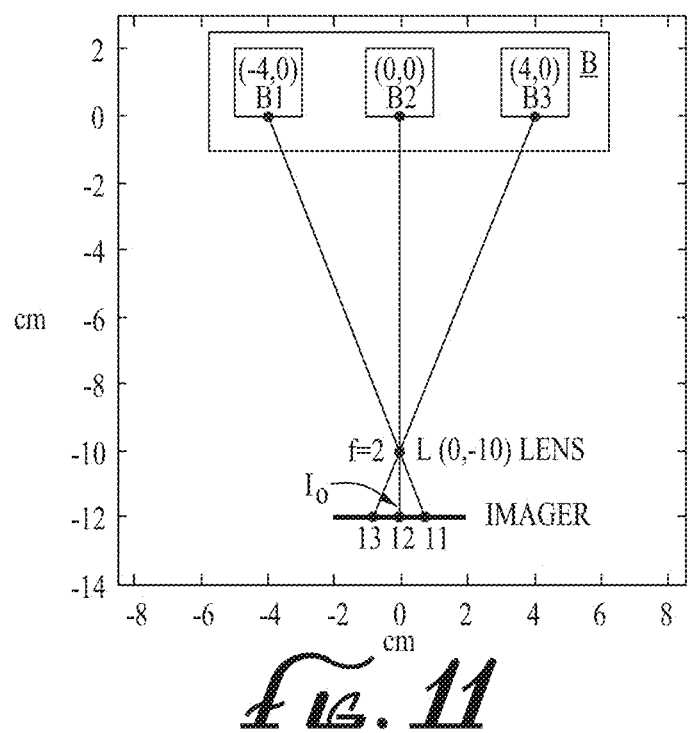
FIG. 11 is a graph representing a region of a calibration target including three optical codes in a field of view of an imaging system of FIGS. 1-3.

FIG. 11 is a graph representing a calibration target B with optical codes at locations B1, B2, and B3 on the target B in a field of view of an imaging system of the reader 14/15. For simplicity, this example is given using a one-dimensional imager in two-dimensional affine space. However, it should be recognized, given the description herein, that the principles, methods, and computations provided in this example may be applied to a two-dimensional imager in three-dimensional affine space. For example, while the locations B1, B2, and B3 are horizontally aligned for simplicity, for a three-dimensional affine space, three adjacent optical codes 212 (FIG. 4) include at least one optical code with a unique Y-coordinate. Accordingly, three optical codes provide centroids positioned at three different locations and therefore establish an overdetermined solution for conventional geometric camera calibration transformation equations. The equations yield solutions for position (also referred to as translation about X, Y, and Z axes) and orientation (also referred to as rotation about the yaw, pitch, roll, or Euler angles) of a projection center.

The imaging system shown in FIG. 11 includes a lens at lens point L and an imager. The imaging system captures an image showing that the location B1 of an optical code (e.g., the location of the optical code's geometric center, or centroid) is at (−4, 0) cm, a location B2 of an optical code is at (0, 0) cm, and a location B3 of an optical code is at (4, 0) cm. Based on installation specifications, the lens point L of the imaging system is initially estimated at a location at (0, −10) cm. The pinhole camera model uses a focal length parameter, f, that corresponds to the lens-to-imager distance, which in this example is 2 cm. The center point $I_0$ of the imager, which also corresponds to I2 in this example, is located at (0, −12) cm. An imager plane is defined from point $I_0$ and corresponds to the plane normal to a vector:

$$\vec{n} = L - I_0 \qquad (1)$$

When the image is captured by the imaging system, the left side optical code of target B is represented in the image at a location I1 in the imager plane. Location I1 can be computed as the intersection line connecting lens point L to optical code location B1 and the imager plane. It can be said that for a point p on the imager plane that:

$$(p - I_0) \cdot \vec{n} = 0 \qquad (2)$$

where · is the dot product of two vectors. The equation for a line including lens point L and location B1 may be in the form of:

$$p = L + d\vec{v} \qquad (3)$$

where $\vec{v}$ is a line direction vector defined as:

$$\vec{v} = B1 - L \qquad (4)$$

and d is the distance (in units of length of $\vec{v}$) along the line including lens point L and location B1. If d=0, point p in equation 3 is lens point L, and if d=1, point p in equation 3 corresponds to location B1. Setting the points p in equations 2 and 3 equal (i.e., a point on the line including L and B1 equals a point on the imager plane) yields a value of d defining the distance along the line including L and B1. Setting points p in equations 2 and 3 equal yields an equation for d in the form of:

$$d = \frac{(I_0 - L) \cdot \vec{n}}{\vec{v} \cdot \vec{n}} \quad (5)$$

The point p of intersection with the imager plane is found by substituting d into equation 3—the line equation. Specifically, for the example of FIG. 11 in which the parameters are B1=(-4, 0) cm, L=(0, -10) cm, f=2, $\vec{n}$ =(0, 2) cm, and $\vec{v}$ =(-4, 10) cm, solving for d yields d=-0.2 cm. Thus, the location I1 on the imager plane is equal to (0.8, -12) cm. In this example, a location I2 corresponding to the center optical code location B2 is equal to (0, -12) cm, and a location I3 corresponding to the right side optical code location B3 is equal to (-0.8, -12) cm.

The above calculations for a point p in the imager plane can be performed in reverse to compute a back projection ray from the imager plane, through lens point L to the optical code locations B1, B2, and B3. For example, if the image-coordinate locations of a centroid from an image of an optical code are known, the pixel offset from the center of the image can be calculated. This pixel offset can be converted to a distance by multiplying the pixel offset by the pixel size. The distance of the pixel offset can then be used with the other known parameters (e.g., L, f, $\vec{n}$ ) and the above equations to compute a back projection ray from the image-coordinate location through the lens to the optical code.

While three optical codes included in the target B are decoded, image-coordinate locations are extracted for vertices of a bounding box, or for other locations, such as a centroid. These locations are then back-projected using the pinhole camera model that has initial estimates for position and orientation of the imaging system. In some embodiments, the initial estimates are based on specified manufacturing installation locations for the imaging system. The back projection produces a measured (or observed) system-coordinate location according to the example above. Additionally, the actual system-coordinate locations of the optical code features are known because the calibration target is placed in a known location. Therefore, a difference between the measured location and the actual location may then be calculated and minimized according to a cost function that is recomputed after each adjustment of the parameters of the camera model in order to optimize the parameters.

In some embodiments, the cost function is a sum of squared distances between the known and observed calibration-control points. Accordingly, the estimated extrinsic parameters can be iteratively adjusted so that the sum of squared distances between the known and observed calibration-control points is decreased to an acceptable threshold, thereby optimizing the estimate of the extrinsic parameters. Other non-linear and linear least squares techniques may also be used to optimize the parameters.

In some embodiments, the orientation and position parameters are optimized in sequential stages. For example, the orientation parameters are optimized first based on an initial estimate of the position parameters, and then the position parameters are optimized in a subsequent stage.

Notably, as discussed above, the calibration results in a position of a projection center of a view, not the actual location of the imager; however, other camera models may be used to account for the optical path lengths between mirrors and orientation of individual optic elements in order to derive the position of the imager or the optical center of the imager.

Figure 12:
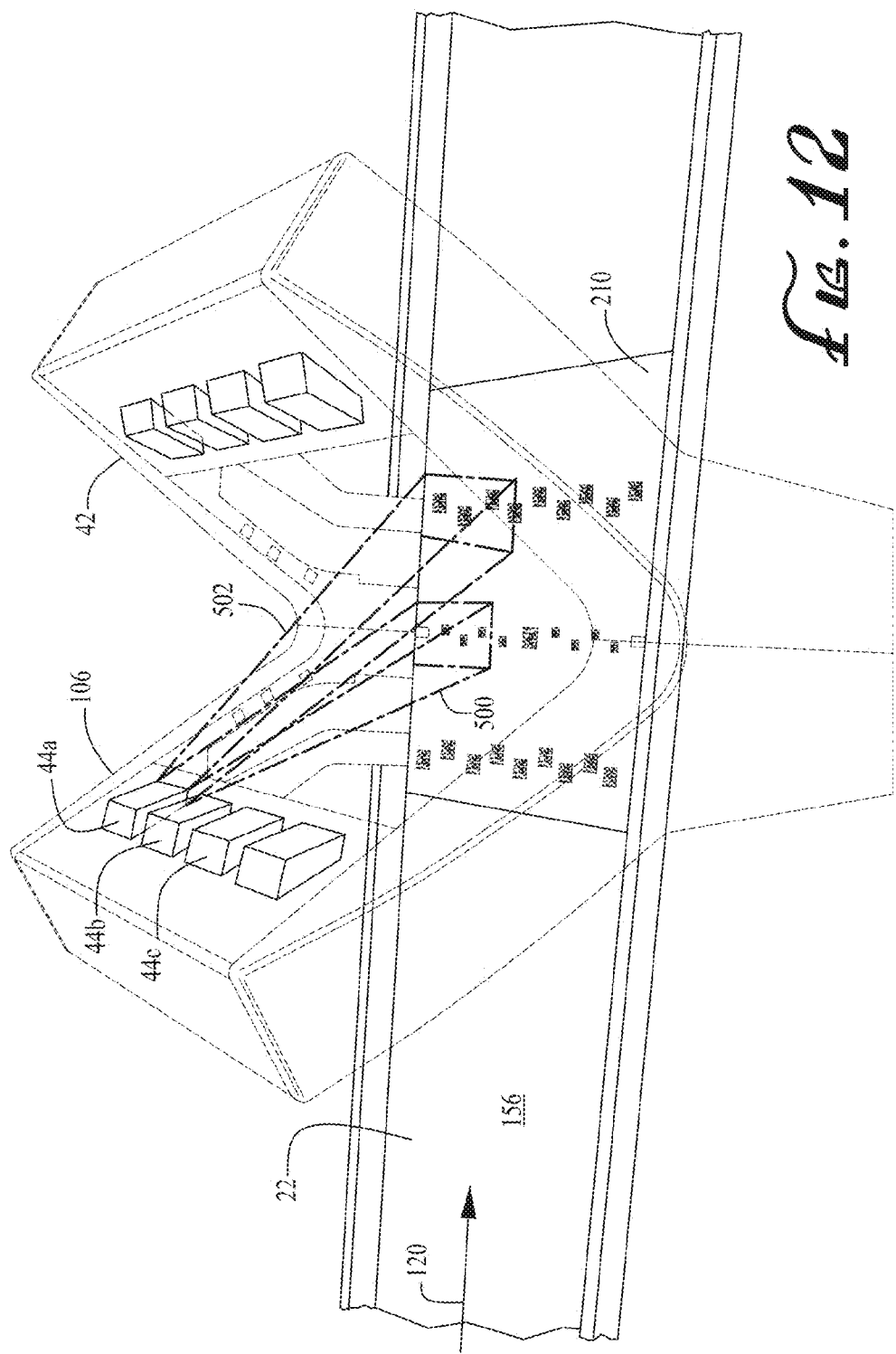
FIG. 12 is a perspective view of the automated data reading system of FIGS. 1-3, showing overhead imaging systems having high and low fields of views, with each field of view encompassing a region of the top surface of FIG. 4 that includes three optical codes.
Figure 13:
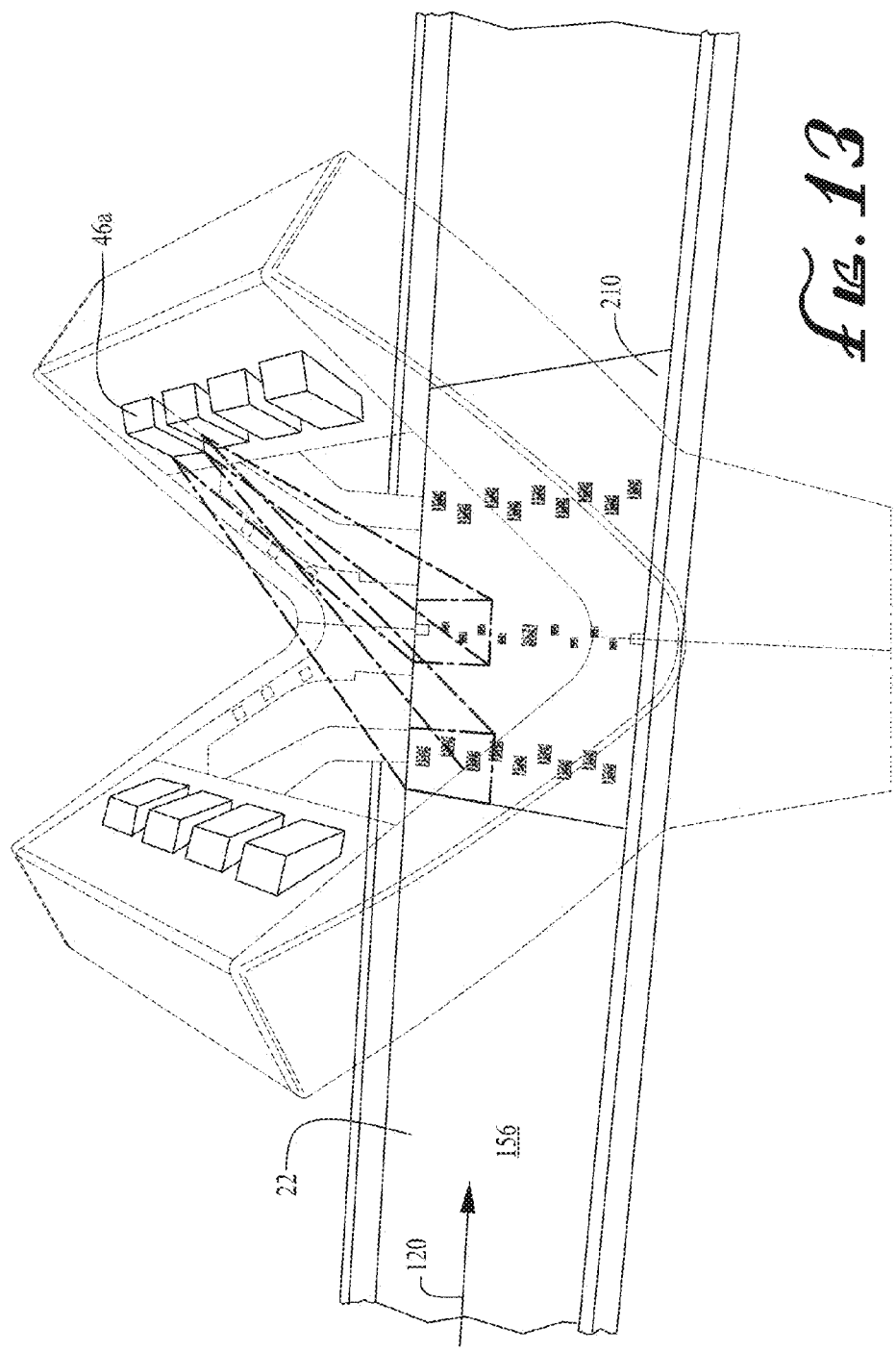
FIG. 13 is a perspective view of the automated data reading system of FIGS. 1-3, showing overhead imaging systems having high and low fields of views, with each field of view encompassing a region of the top surface of FIG. 4 that includes three optical codes.

FIGS. 12 and 13 are perspective views of the automated data reading system 12 of FIGS. 1-3. FIGS. 12 and 13 show overhead imaging systems 44 and 46, and nominal locations for high and low fields of view, with each field of view encompassing a region of the top surface of FIG. 4 that includes three optical codes. For example, in a nominal installation position and orientation, the imaging system 44a, which is located proximal the side arm 106, has a low field of view 500 that encompasses TC16, TC17, and TC18 optical codes 212 (FIG. 4); and a high field of view 502 encompasses TX25, TX26, and TX27 optical codes 212. Because neighboring imaging systems have overlapping fields of view, imaging system 44b has fields of view that partly overlap the fields of view of the imaging system 44a, and that overlap the fields of view of imaging system 44c. Thus, a low field of view (not shown) of the imaging system 44b encompasses TC14, TC15, and TC16, and a high field of view encompasses TX23, TX24, and TX25 so that both the imaging systems 44a and 44b read TC16 and TX25. Each projection center may be calibrated in a similar fashion described above by using the observed and known locations of the imaged optical codes on the top surface 230. Similarly, the imaging system 46a images center and entry-side optical codes on the top surface 230.

Figure 14:
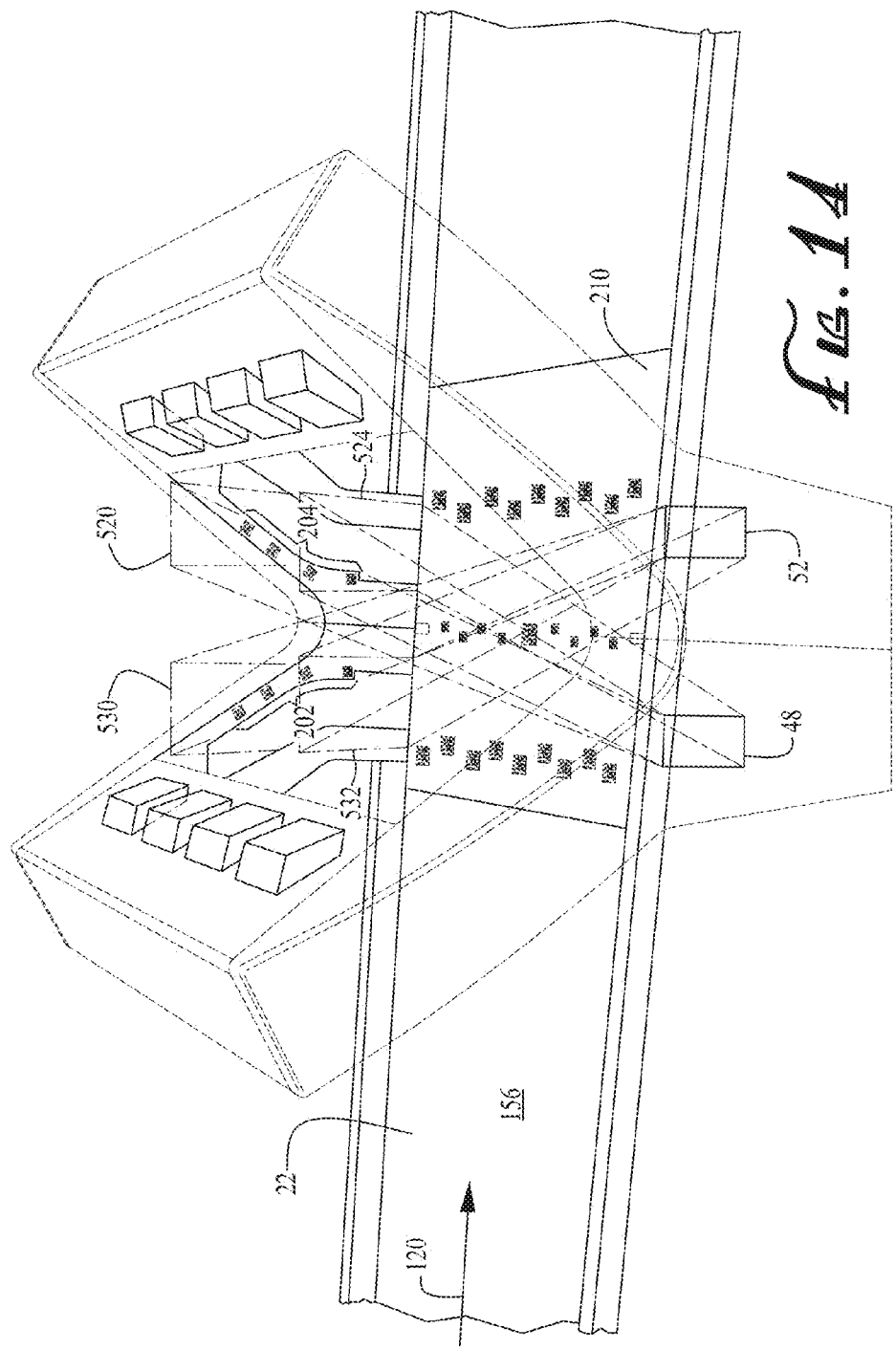
FIG. 14 is a perspective view of the automated data reading system of FIGS. 1-3, showing lateral imaging systems having high and low fields of views, with each field of view encompassing a region of a confronting calibration target of FIGS. 6A and 6B.

FIG. 14 is a perspective view of the automated data reading system 12 of FIGS. 1-3. FIG. 14 shows lateral imaging systems 48 and 52 with nominal locations for high and low fields of view encompassing a region of the confronting calibration patterns 202 and 204 of FIG. 6A or 6B. A high field of view 520 of the imaging system 48 encompasses an upper region of the calibration pattern 204, and a low field of view 524 encompasses a lower region of the calibration pattern 204. Likewise, a high field of view 530 of the imaging system 52 encompasses an upper region of the calibration pattern 202, and a low field of view 532 encompasses a lower region of the calibration pattern 202. Although not shown, the imaging systems 50 and 54 produce similar fields of view that encompass corresponding read-zone confronting surfaces of the side arms 104 and 108. Each projection center may be calibrated in a similar fashion described above by using the observed and known locations of the imaged optical codes on the patterns 202 and 204.

Figure 15:
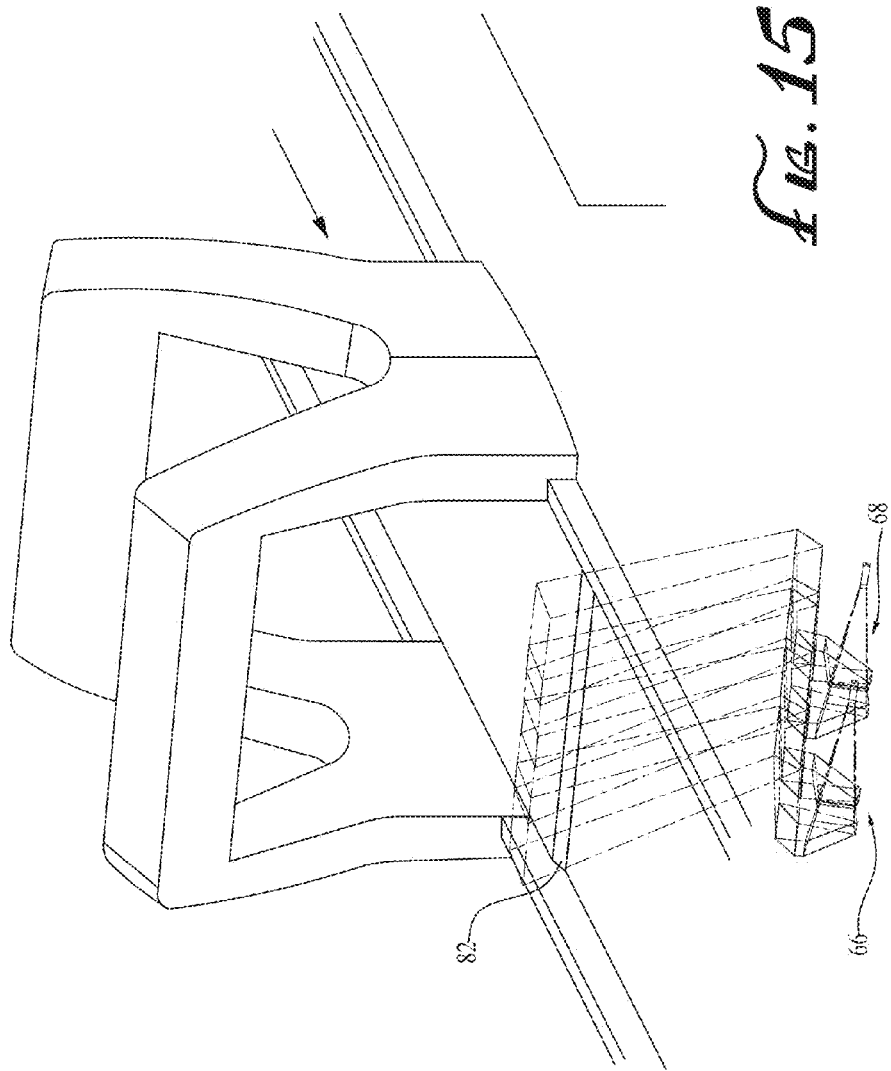
FIG. 15 is an isometric view of the automated data reading system of FIGS. 1-3 showing fields of view for a pair of inlet-side bottom-surface imaging systems.

FIG. 15 is an isometric view of the automated data reading system of FIGS. 1-3, showing bottom-surface imaging systems 66 and 68 having split fields of view. FIG. 16A is a rendering of the bottom surface 260 (FIG. 5) of the template 210 annotated to show the nominal location of fields of view 602 and 604 from the imaging system 66, and the nominal locations of fields of view 608 and 610 from the imaging system 68. FIG. 16B is an enlarged view of optical codes and fields of view 602, 604, 608, and 610 shown in FIG. 16A. Nominal locations are also shown for the fields of view of the imaging systems 70 and 72. It should be understood that when the template 210 is deployed, the imaging systems 66 and 68 capture images of decodable regions labeled A1-AF with fields of view 602, 604, 608, and 610. Similarly, the imaging systems 70 and 72 collectively capture images of decodable regions labeled L1-LF.

Figure 17:
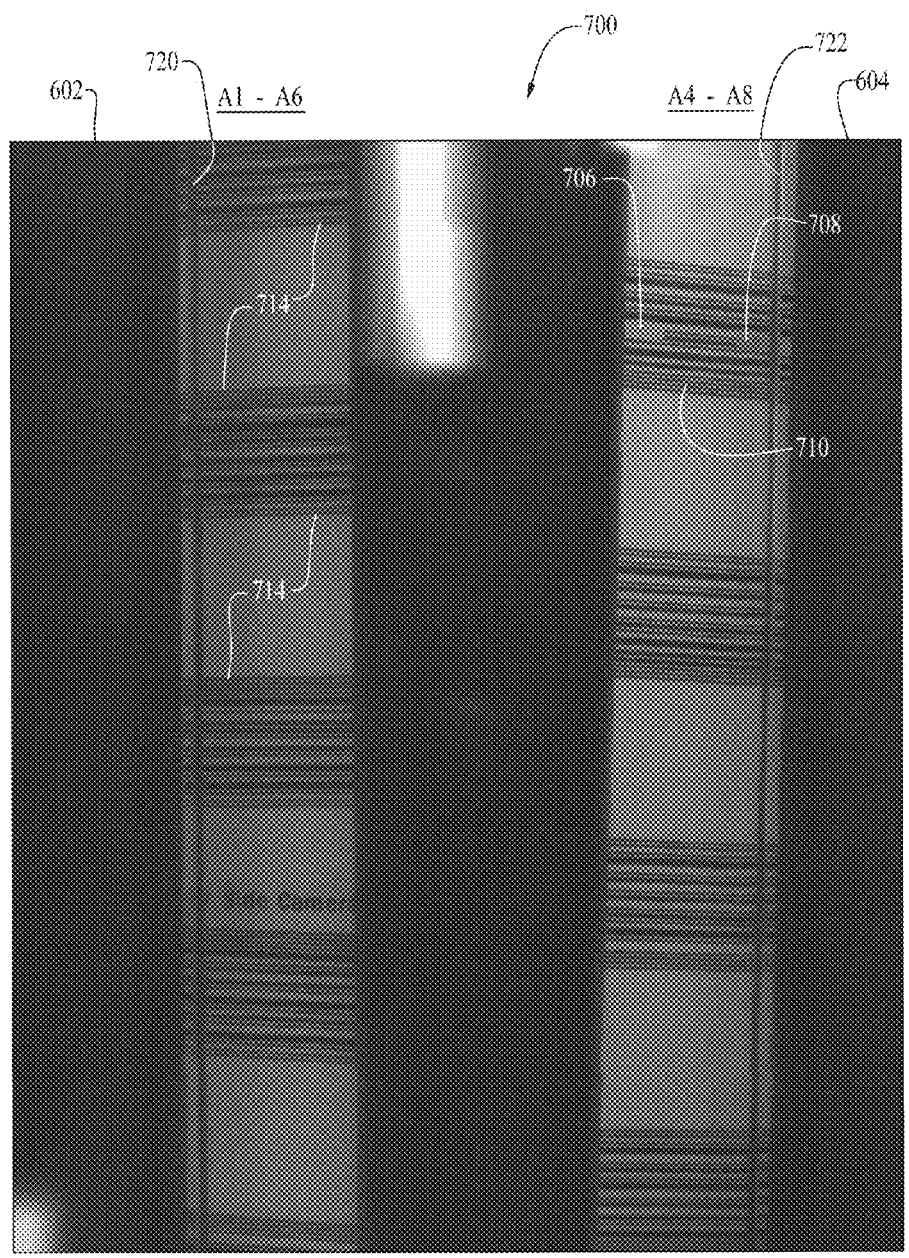
FIG. 17 is an image representing a region from another embodiment of a template for calibrating bottom-surface imaging systems, the image showing a light-refraction strip imparted by a transition plate causing redundant decodes for optical codes of the template that do not have redacted modules.
Figure 18:
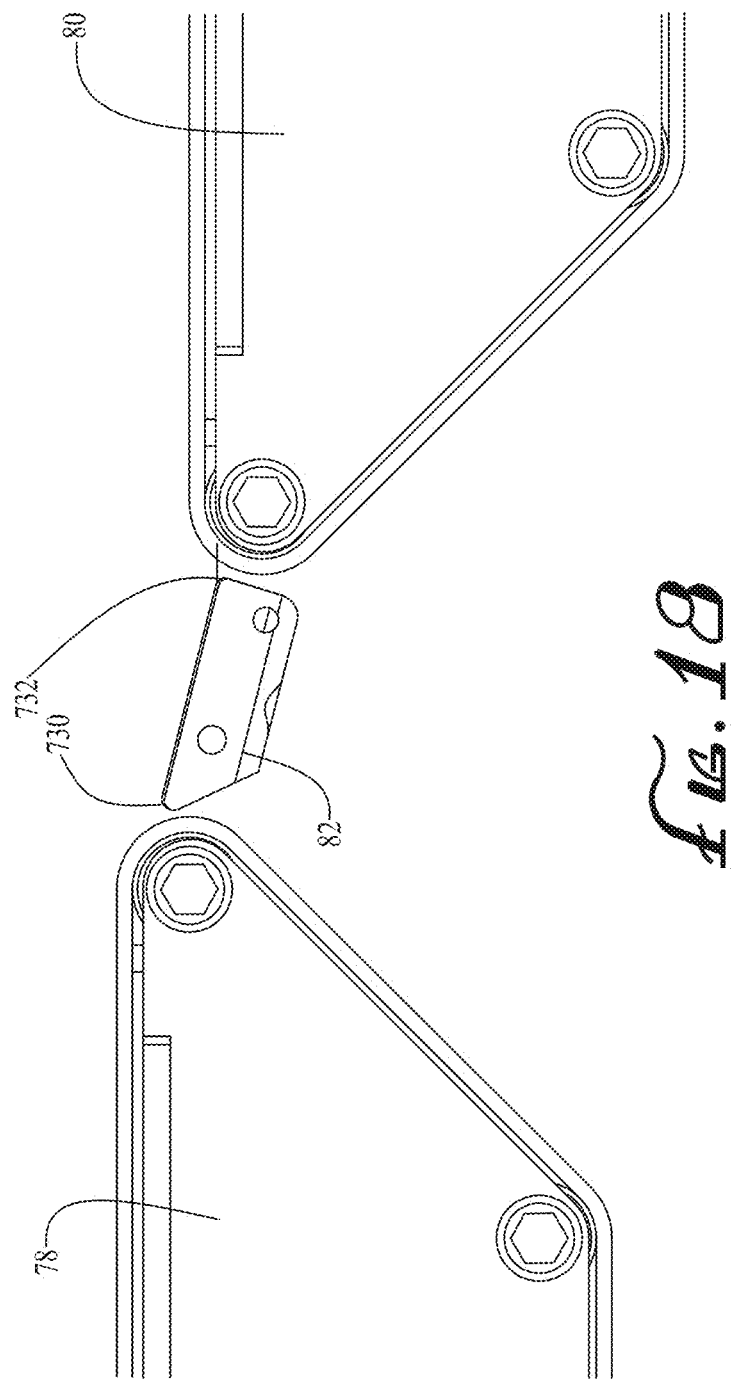
FIG. 18 is a cross section view taken along line 18-18 of FIG. 1, showing a fragment of the conveyor system including a gap and a transition plate between an inlet and outlet conveyor.

FIG. 17 shows a rendering of image data 700 obtained by imaging systems 66 and 68 after imaging another embodiment of a calibration template positioned on the conveyor surface 156. The left side of the image data 700 generally corresponds to decodable regions A1-A6 obtained from the field of view 602. The right-side corresponds to decodable regions A4-A8 obtained from the field of view 604. To demonstrate how redundant decodes are caused by light refraction from the transition plate 82 (FIG. 18), the calibration template shown in FIG. 17 has redacted portions 706 and 708 for one optical code 710, while the remaining optical codes 714 are unredacted. Consequently, the other optical codes 714 appear bifurcated in the image data due to refraction stripes 720 and 722 caused by opposing faces 730 and 732 (FIG. 18). Thus, the refraction stripes 720 and 722 create two decodable regions per barcode, which may cause ambiguity in the calibration process as described with reference to FIG. 19.

Figure 19:
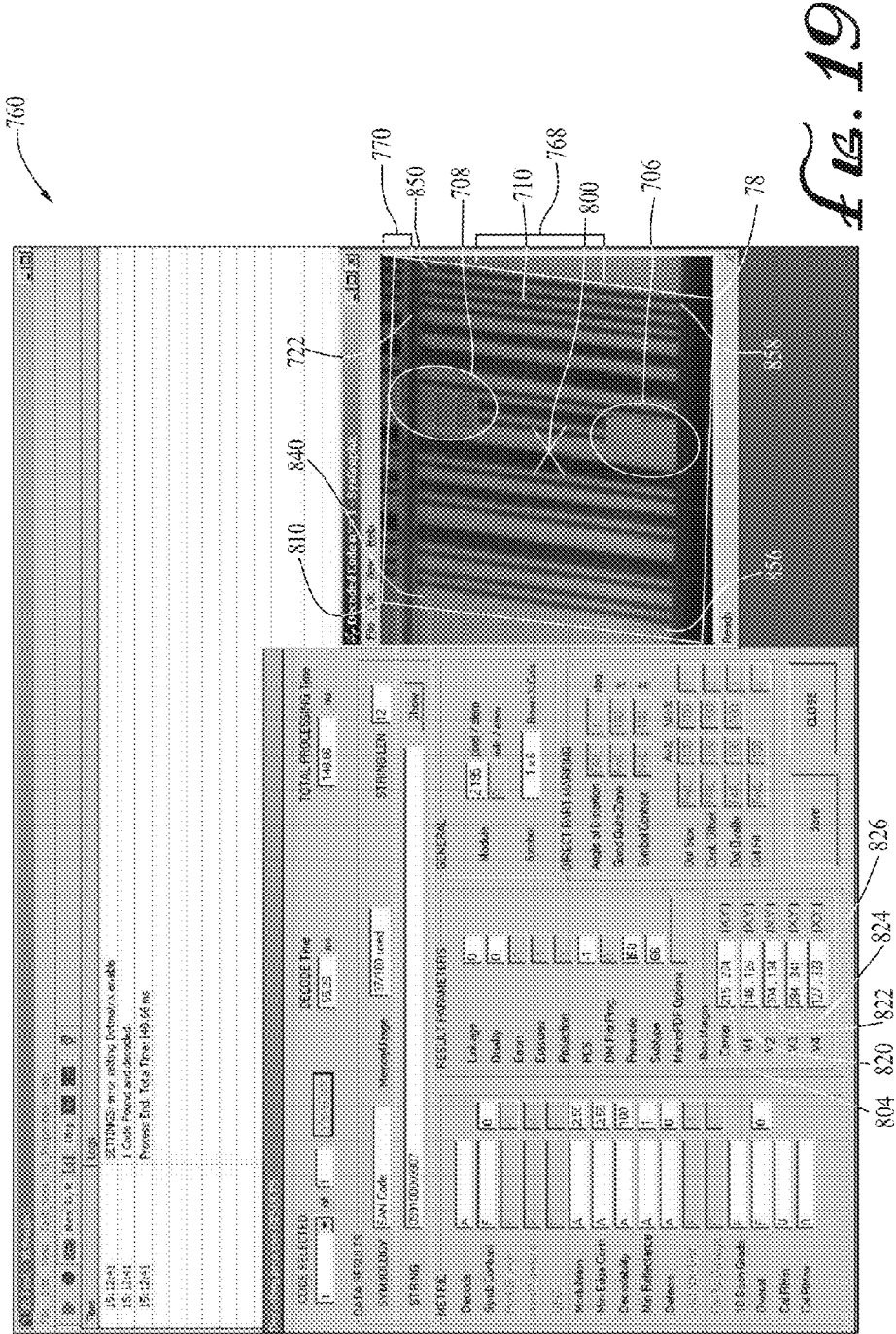
FIG. 19 is a screen capture of a graphical user interface showing a linear optical code having redacted modules to inhibit redundant decodes, and showing, for the single decode, image-coordinate locations of a centroid and of vertices for a bounding box.

FIG. 19 is a screen capture of a graphical user interface 760 showing the linear optical code 710 with the redacted portions 706 and 708 inhibiting redundant decodes. For example, the redacted portion 708 removes portions of modules from the optical code 710 on either side of the refraction stripe 722 to create one, centrally located decodable region 768. The redacted portion 708 does not allow decoding of a region 770, which would otherwise produce two centroids per optical code. Redundant centroids may cause ambiguity in determining a region-of-interest (ROI) for a frame of image data.

An ROI is a portion of the frame of image data that is selectively obtained or produced (i.e., read out) by an imaging system, with the remaining portion of the image data being discarded or otherwise unused. For example, in line-capture mode, a center row of pixels in an ROI (i.e., a centerline) is read out so that an imaging system reads one row of pixels in an ROI for a frame of image data. In area-capture mode, an area encompassing the center row, e.g., the centerline +/−85 rows of pixels on either side, is read out. Compared with reading out all the image data per frame, the ROI reduces bandwidth and increases cycle time because an image processor produces a smaller portion of image data per frame. In some embodiments, the ROI generally corresponds to the width between the conveyor sections 78 and 80 (also referred to as gap width), although various other configurations are possible.

A centerline of an ROI may be determined by identifying decodable regions, such as decodable region 280 (FIG. 5), from image data of the bottom surface 260; identifying centroids of adjacent optical codes 264; and interpolating the centerline based on the centroids. Similarly, the area of the ROI can be determined based on interpolating vertices of bounding boxes. Therefore, the ROI can be readily obtained by interpolating centroids, but as noted above, redundant centroids may cause ambiguity in the interpolation process.

The centroids may be determined in a similar manner as explained above with respect to the bounding boxes 380 and 382 (FIG. 9B). In the example of FIG. 19, a centroid 800 is identified at an image-coordinate location 804 based on a bounding box 810 with image-coordinate corner locations 820, 822, 824, and 826. The refraction stripe 722 defines the distal ends 840 and 850 of start and stop modules, and the inlet conveyor section 78 defines distal ends 856 and 858. The bounding box 810 includes an optional ten percent margin from the distal ends 840, 850, 856, and 858. The start and stop modules extend beyond the width of the gap 76 so that the gap 76 defines a portion of the optical code 710 visible to bottom-surface imagers. The centroid 800 is generally located at the center of the visible portion of the optical code 710 and therefore coincides with the centerline.

FIG. 20 is a rendering of an opposing bottom surface 880 of the calibration template 210 of FIGS. 3 and 4, according to another embodiment. The surface 880 includes 2-D Data Matrix optical codes 884 that are provided to calibrate the position and orientation of the bottom-surface imaging systems 66, 68, 70, and 72 according to the techniques described above. However, in some embodiments, the gap width is narrow (i.e., a narrow ROI) so that the extrinsic parameters for the lower data reader 15 need not be optimized to the same degree as the upper data reader 14. Thus, the optical codes 884 are optional, and the specified installation location may provide sufficient accuracy for computing back projection rays from the bottom-surface imaging systems 66, 68, 70, and 72.

Example Calibration and Self-Test Configurations

Although the reader 14/15 has been described as including imaging systems to capture images of optical codes to decode them, the reader 14/15 may include, in addition to or in place of the imaging systems, a laser-based scanning system to detect and decode the optical codes of objects. The positioning and aim of lasers of the laser-based scanning system may be used to generate back projection rays that project into the read zone 26 along paths corresponding to those of laser beams generated by the lasers.

The system 12 and its associated subsystems may include computing devices, such as processors, and associated software or hardware constructs, and/or memory to carry out certain functions and methods. The computing devices may be embodied in a single central processing unit, or may be distributed such that a system has its own dedicated processor. Moreover, some embodiments of subsystems may be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

An example calibration system for calibrating position and orientation parameters of an imaging system in an automated data reading system comprises a planar calibration target configured to be coupled to a housing of the automated data reading system and superimposed on a surface of the automated data reading system, the planar calibration target including spaced-apart optical codes disposed at predetermined locations on a surface of the automated data reading system to define known locations of calibration-control points; an optical code decoder configured to receive, from the imaging system, image data representing an imaged portion of the planar calibration target that includes the optical codes, and further configured to determine from the image data observed locations of the calibration-control points; and a computing device configured to calibrate the position and orientation parameters based on differences between the known and observed locations.

In some embodiments of the aforementioned example calibration system, the planar calibration target includes two-dimensional optical codes. In still other embodiments, the planar calibration target includes optical codes with void areas to inhibit duplicate decodes from a bottom-surface imaging system. The imaging system has a consistent focal length adjustment throughout a calibration process, according to some embodiments. In still further embodiments, the optical code decoder is the computing device.

In some embodiments of the aforementioned example calibration system, the planar calibration target comprises a freestanding template with keyed portions configured to engage corresponding grooves of the housing of the automated data reading system while the freestanding template is superimposed on a conveyor surface of the automated data reading system. In some embodiments, the planar calibration target comprises multiple optical codes on confronting sidewalls of the housing that border a read zone of the automated data reading system. The optical codes are superimposed by printing, according to some embodiments.

In some embodiments of the aforementioned example calibration system the optical codes represented in the image data are undecodable in a normal mode and decodable in a calibration mode. Modules of the optical codes are color-inversed, mirrored, infrared reflective, transposed, or a combination of the four, according to some embodiments. In some embodiments, optical codes represented in the image data are underexposed in the normal mode and sufficiently exposed in the calibration mode to decode the optical codes from the image data.

An example multi-plane calibration system configured to provide contemporaneous calibration of multiple imaging systems positioned around a read zone of an automated data reading system comprises a freestanding template having calibration optical codes on its opposing sides, the freestanding template being configured to mechanically engage a housing of the automated data reading system to position the calibration optical codes at known locations with respect to the automated data reading system; and calibration optical codes printed on sidewalls of the housing at locations that are known with respect to the automated data reading system.

An example self-test system for an automated data reader comprises optical codes coupled to sidewalls of a housing of the automated data reader, the optical codes being undecodable in a normal mode and decodable in a self-test or calibration mode.

In some embodiments of the aforementioned example self-test system, modules of the optical codes are color-inversed, mirrored, infrared reflective, transposed, or a combinations of the four.

In some embodiments of the aforementioned example self-test system, an imaging system is configured to obtain image data representing the optical codes that are underexposed in the normal mode and adequately exposed in the calibration mode.

Example Methodologies

FIG. 21A is a flowchart showing a method 900 of calibrating position and orientation parameters of an imaging system in an automated data reading system. Dashed lines depict optional steps.

The method 900 comprises obtaining 905, from the imaging system, image data representing an imaged portion of a planar calibration target that is superimposed on a surface of the automated data reading system, the imaged portion of the planar calibration target including spaced-apart optical codes disposed at predetermined locations on a surface of the automated data reading system to define known locations of calibration-control points on the surface; identifying 910 the optical codes in the image data to obtain observed locations of the calibration-control points represented by the image data; and calibrating 915 position and orientation parameters of the imaging system based on differences between the known and observed locations.

FIG. 21B is a flowchart showing in greater detail, according to some embodiments, the step of calibrating 915 comprising determining 920 the position and orientation parameters of the imaging system based on a camera model that fits the known locations to the observed locations in accordance with a forward- or back-projection model. Refining 925 the camera model iteratively is also a step included in some embodiments.

FIG. 21C is a flowchart showing in greater detail, according to some embodiments, that the step of refining 925 may include adjusting 930 estimated position and orientation parameters of the camera model; determining 935, based on the camera model, a value of a cost function representing spatial differences between the known and observed locations; and repeating 940 the steps of adjusting 930 and determining 935 until the value of the cost function is within a desired limit. In some other embodiments, the cost function comprises a sum of squared distances between the known and observed locations; and refining 925 includes repeating 940 the steps of adjusting 930 and determining 935 until the sum of squared distances is minimized. Step 945 shows that the estimated position and orientation parameters may also be (optionally) initialized to predetermined values based on a specified installation location of the imaging system in the automated data reading system.

FIG. 21A also includes an optional step of determining 950, for the optical codes represented in the image data, coordinates of centroids that correspond to the observed locations. As discussed previously, this optional step may be performed as part of a decoding process. For example, FIG. 21D is a flowchart showing in greater detail, according to some embodiments, that the step of determining 950 includes determining 955 bounding boxes for the optical codes in the image data; determining 960 centroids of the bounding boxes; and determining 965 a region of interest based on bounding boxes and centroids.

FIG. 21A also indicates at optional step 970 that the imaging system may comprise multiple imaging systems. For example, the imaging system includes a top-side imaging system with a first field of view configured to project toward a conveyor system, a bottom-side imaging system with a second field of view configured to project via a gap in the conveyor system, and opposing sidewall imaging systems with corresponding and partly overlapping fields of view configured to project laterally. When the planar calibration target comprises a multi-plane calibration target having first and second opposing sides that respectively confront the first and second fields of view, and having third and fourth confronting sides that respectively confront the partly overlapping fields of view, the method 900 includes contemporaneously performing 970 the step of calibrating for the multiple imaging systems. Similarly, when the automated data reading system includes optics configured to subdivide a field of view of the imaging system to establish a discontiguous field of view with multiple projection centers having associated position and orientation parameters, the method 900 may include performing 975 the step of calibrating for the multiple projection centers.

The calibration target is coupled to a housing of the automated data reading system, according to some embodiments. When the housing includes the optical codes affixed thereto to define the planar calibration target that is superimposed on the surface of the housing, the method 900 may further comprise configuring 980 the automated data reading system to transition from a first mode in which the optical codes are not decodable to a second mode in which the optical codes are decodable. In some embodiments, the first and second modes may comprise exposure control settings, in which case the step of configuring 980 comprises transitioning 985 from a first exposure control setting in which the optical codes are not represented in the image data to a second exposure control setting in which the optical codes are represented in the image data. In other embodiments, the first and second modes comprise illumination control settings for an infrared-illumination source of the automated data reading system, and the optical codes comprise infrared-reflective print on the housing. Thus, the step of configuring 980 comprises transitioning 990 from a first illumination control setting in which the infrared-illumination source does not produce infrared illumination and the optical codes are not represented in the image data to a second illumination control setting in which the infrared-illumination source produces infrared illumination and the optical codes are represented in the image data.

Optionally, some embodiments may include producing an indication 995 that the step of calibrating is concluded. For example, when the planar calibration target comprises a freestanding template with keyed portions configured to engage corresponding portions of a housing of the automated data reading system while the template is superimposed on a conveyor surface of the automated data reading system, the method may also comprise notifying 997 a user to uncouple and remove the freestanding template away from the conveyor surface in response to the step of producing 995 an indication.

An example method of multi-plane calibration in a system configured to provide contemporaneous calibration of multiple imaging systems positioned around a read zone of an automated data reading system comprises positioning a freestanding template having calibration optical codes on its opposing sides, the freestanding template configured to mechanically engage a housing of the automated data reading system to position the calibration optical codes at known locations with respect to the automated data reading system; and initiating imaging of the template and of calibration optical codes printed on sidewalls of the housing at locations that are known with respect to the automated data reading system.

The aforementioned embodiments of a data reader are described in a retail setting that should not be considered limiting. Other uses for data readers with the characteristics and features as described may be possible. For example, industrial locations such as a parcel distribution (e.g., postal) station are contemplated and within the scope of this disclosure. Furthermore, though examples are provided primarily with respect to an automated data reader, the systems and methods may be employed in self-checkout systems using manual or semi-automatic data readers, and the techniques may be used to calibrate intrinsic parameters (e.g., focal length). Finally, skilled persons should understand that many changes may be made to the details of the above-described embodiments without departing from the underlying principles of this disclosure. The scope of the present invention should, therefore, be determined only by the following claims.

The invention claimed is:

1. A method of calibrating position and orientation parameters of an imaging system in an automated data reading system, the automated data reading system including an optical code decoder system configured to decode first optical codes when the first optical codes are detected from items in response to the items being transported through a read zone established by the imaging system, the method comprising:
    obtaining, from the imaging system, image data representing an imaged portion of a planar calibration target that is superimposed in the read zone on a surface of the automated data reading system, the imaged portion of the planar calibration target including spaced-apart second optical codes disposed at predetermined positions on a surface of the automated data reading system to define known locations of calibration-control points on the surface, the second optical codes each including multiple modules of contrasting colors positioned according to an optical code symbology to encode information based on a spatial arrangement of the multiple modules;
    providing the image data to the optical code decoder system to determine an observed location of a calibration-control point from each one of the second optical codes based on the spatial arrangement of the multiple modules to establish from the second optical codes observed locations of the calibration-control points represented by the image data; and
    calibrating position and orientation parameters of the imaging system based on differences between the known and observed locations of the calibration-control points.

2. A method according to claim 1, in which the calibration target is coupled to a housing of the automated data reading system.

3. A method according to claim 2, in which the housing includes the second optical codes affixed thereto to define the planar calibration target that is superimposed on the surface of the housing, the method further comprising:
    configuring the automated data reading system to transition from a first mode in which the second optical codes are not decodable to a second mode in which the second optical codes are decodable.

4. A method according to claim 3, in which the first and second modes comprise exposure control settings, the step of configuring comprising:
    transitioning from a first exposure control setting in which the second optical codes are not represented in the image data to a second exposure control setting in which the second optical codes are represented in the image data.

5. A method according to claim 1, in which the step of calibrating comprises:
    determining the position and orientation parameters of the imaging system based on a camera model that fits the known locations to the observed locations in accordance with a forward-projection model.

6. A method according to claim 1, in which the step of calibrating comprises:
    determining the position and orientation parameters of the imaging system based on a camera model that fits the observed locations to the known locations in accordance with a back-projection model.

7. A method according to claim 6, further comprising: refining the camera model iteratively.

8. A method according to claim 7, in which the step of refining comprises:
adjusting estimated position and orientation parameters of the camera model;
determining, based on the camera model, a value of a cost function representing spatial differences between the known and observed locations; and
repeating the steps of adjusting and determining until the value of the cost function is within a desired limit.

9. A method according to claim 8, further comprising:
initializing the estimated position and orientation parameters to predetermined values based on a specified installation location of the imaging system in the automated data reading system.

10. A method according to claim 1, in which the imaging system comprises multiple imaging systems including a top-side imaging system with a first field of view configured to project toward a conveyor system, a bottom-side imaging system with a second field of view configured to project via a gap in the conveyor system, and opposing sidewall imaging systems with corresponding and partly overlapping fields of view configured to project laterally, and in which the planar calibration target comprises a multi-plane calibration target having first and second opposing sides that respectively confront the first and second fields of view, and having third and fourth confronting sides that respectively confront the partly overlapping fields of view, the method further comprising:
contemporaneously performing the step of calibrating for the multiple imaging systems.

11. A method according to claim 1, in which the automated data reading system includes optics configured to subdivide a field of view of the imaging system to establish a discontiguous field of view with multiple projection centers having associated position and orientation parameters, the method further comprising:
performing the step of calibrating for the multiple projection centers.

12. A method according to claim 1, further comprising:
producing an indication that the step of calibrating is concluded.

13. A method according to claim 12, in which the planar calibration target comprises a freestanding template with keyed portions configured to engage corresponding portions of a housing of the automated data reading system while the template is superimposed on a conveyor surface of the automated data reading system, the method further comprising:
notifying a user to uncouple and remove the freestanding template away from the conveyor surface in response to the step of producing an indication.

14. A method according to claim 1, further comprising:
determining bounding boxes for the second optical codes from the image data;
determining centroids of the bounding boxes; and
determining a region of interest based on bounding boxes and centroids.

15. A calibration system for calibrating position and orientation parameters of an imaging system in an automated data reading system configured to decode first optical codes when the first optical codes are detected from items in response to the items being transported through a read zone established by the imaging system, the calibration system comprising:
a planar calibration target configured to be coupled to a housing of the automated data reading system and superimposed in the read zone on a surface of the automated data reading system, the planar calibration target including spaced-apart second optical codes disposed at predetermined positions on a surface of the automated data reading system to define known locations of calibration-control points, the second optical codes each including multiple modules of contrasting colors positioned according to an optical code symbology to encode information based on a spatial arrangement of the multiple modules;
an optical code decoder configured to receive, from the imaging system, image data representing an imaged portion of the planar calibration target that includes the second optical codes, and further configured to determine from the image data an observed location of a calibration-control point from each one of the second optical codes based on the spatial arrangement of the multiple modules to establish from the second optical codes observed locations of the calibration-control points; and
a computing device configured to calibrate the position and orientation parameters based on differences between the known and observed locations of the calibration-control points.

16. A calibration system according to claim 15, in which the second optical codes include two-dimensional optical codes.

17. A calibration system according to claim 15, in which the planar calibration target comprises a freestanding template with keyed portions configured to engage corresponding grooves of the housing of the automated data reading system while the freestanding template is superimposed on a conveyor surface of the automated data reading system.

18. A calibration system according to claim 15, in which the second optical codes comprise multiple optical codes on confronting sidewalls of the housing that border the read zone of the automated data reading system.

19. A calibration system according to claim 15, in which the second optical codes represented in the image data are undecodable in a normal mode and decodable in a calibration mode.

20. A calibration system according to claim 19, in which the multiple modules of the second optical codes are color-inversed, mirrored, infrared reflective, transposed, or a combination of the four.

21. A calibration system according to claim 19, in which the second optical codes represented in the image data are underexposed in the normal mode and sufficiently exposed in the calibration mode to decode the second optical codes from the image data.

22. A calibration system according to claim 15, in which the second optical codes include optical codes with void areas to inhibit duplicate decodes from a bottom-surface imaging system.

23. A calibration system according to claim 15, in which the imaging system has a consistent focal length adjustment throughout a calibration process.

* * * * *